United States Patent [19]
Lampert et al.

[11] Patent Number: 5,953,722
[45] Date of Patent: Sep. 14, 1999

[54] METHOD AND SYSTEM FOR FORMING AND USING GEOGRAPHIC DATA

[75] Inventors: David S. Lampert, Highland Park, Ill.; Richard A. Ashby, Blue River, Wis.

[73] Assignee: Navigation Technologies Corporation, Rosemont, Ill.

[21] Appl. No.: 08/935,809

[22] Filed: Sep. 5, 1997

Related U.S. Application Data

[63] Continuation-in-part of application No. 08/740,295, Oct. 25, 1996, and application No. 08/740,298, Oct. 25, 1996.

[51] Int. Cl.[6] .................................................... G06F 17/30
[52] U.S. Cl. .............................. 707/100; 707/104; 707/2; 701/200; 701/201; 701/208; 701/209
[58] Field of Search .................................... 701/200, 201, 701/208, 209; 707/100, 104, 2

[56] References Cited

U.S. PATENT DOCUMENTS

| | | |
|---|---|---|
| 4,630,209 | 12/1986 | Saito et al. . |
| 4,888,698 | 12/1989 | Driessen et al. . |
| 4,937,572 | 6/1990 | Yamada et al. . |
| 5,036,471 | 7/1991 | Tamura et al. . |
| 5,168,452 | 12/1992 | Yamada et al. . |
| 5,170,353 | 12/1992 | Verstraete . |
| 5,285,391 | 2/1994 | Smith, Jr. et al. . |
| 5,406,493 | 4/1995 | Goto et al. . |
| 5,592,665 | 1/1997 | Lahaije ..................................... 395/604 |

OTHER PUBLICATIONS

Matsuyama et al., "A File Organization for Geographic Information Systems Based on Spatial Proximity", Computer Vision, Graphics, and Image Processing, vol. 26, No. 3, Jun. 26, 1984, 0. 303–318.

Frosh, Randy, "A Method of Accessing Large Spatial Databases", Nov. 26–30, 1989, GIS/LIS '89 Conference, Orlando, Florida.

Samet, Hanan, "Strategies for Optimizing the Use of Redundancy in Spatial Databases", Chapter 2.4, The Design and Analysis of Spatial Data Structure, ISBN 0–201–50255–0; (before 1996).

Bentley, Jon L, "Multidimensional Binary Search Trees in Data Applications", IEEE Transactions on Software Engineering, vol. SE–5, No. 4, Jul. 1979, pp. 333–340.

*Primary Examiner*—Paul R. Lintz
*Attorney, Agent, or Firm*—Frank J. Kozak; Lawrence M. Kaplan

[57] ABSTRACT

A system and method for making and using a geographic database. The geographic database represents a geographic region and is used with a navigation application program. The geographic database includes a plurality of data entities each of which represents a physical feature in the geographic region. The plurality of data entities are separated into a plurality of parcels each of which contains a grouping of data entities that represent features in the geographic area encompassed within a separate one of a plurality of rectangles which together encompass all the features in the entire geographic region represented by all of the plurality of data entities. Each of the plurality of data entities has a data entity ID. The data entities contained in each of the plurality of parcels define an associated range of data entity ID's associated with their respective parcel such that the range of data entity ID's associated with each parcel does not overlap the range of data entity ID's associated with any another of the plurality of parcels. Associated with the geographic database is a searchable kd-tree structure whose nodes represent divisions of the geographic region into the rectangles from which the parcels are formed. The kd-tree structure permits spatial searching for a parcel based upon geographic coordinates. The kd-tree also includes data at certain of its nodes that identify the ranges of data entity ID's included in parcels formed from rectangles resulting from the divisions thereby enabling the kd-tree to be used as a binary tree for performing searches using the data entity ID's. Navigation application program functions can search for data by utilizing the kd-tree to conduct either a spatial search using geographic coordinates or a binary search using a data entity ID.

23 Claims, 12 Drawing Sheets

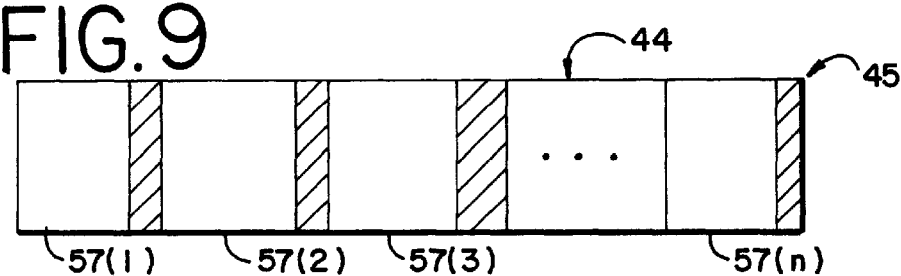
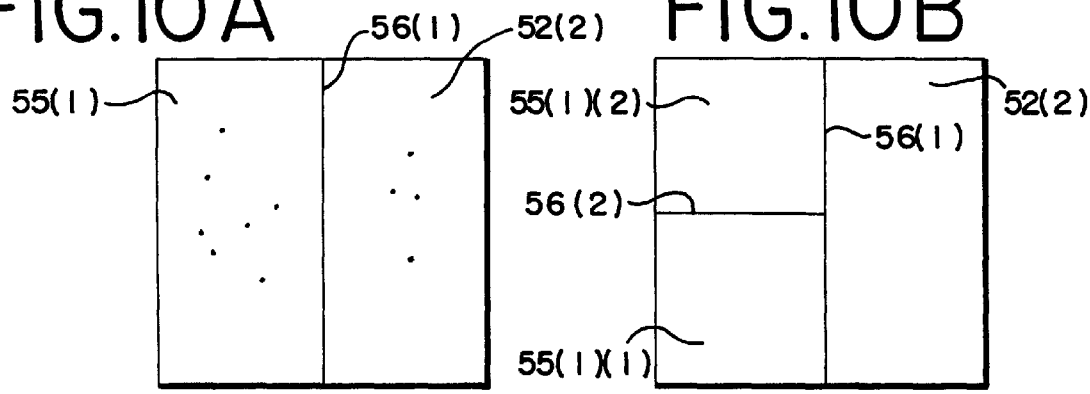
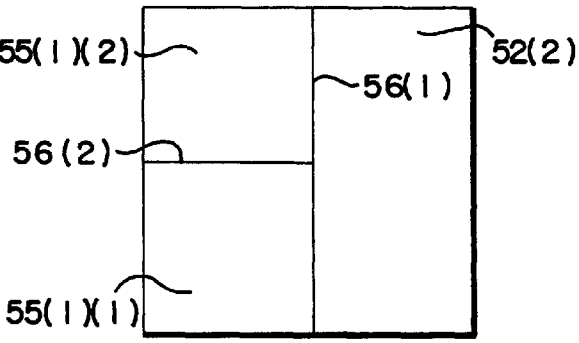
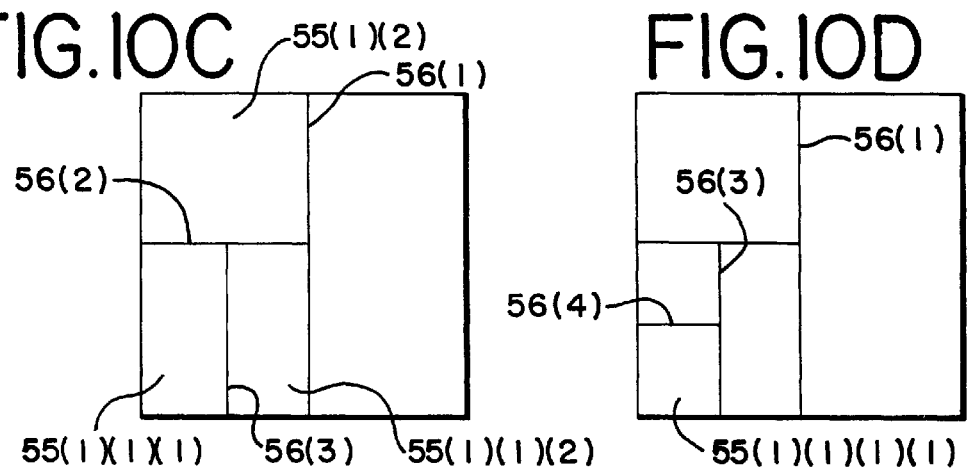
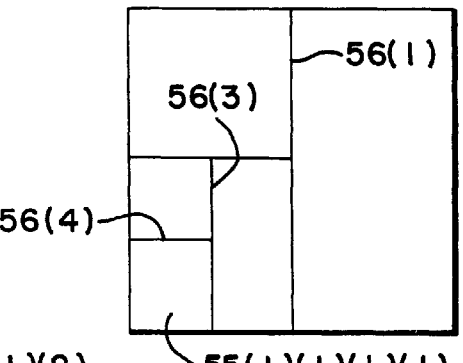
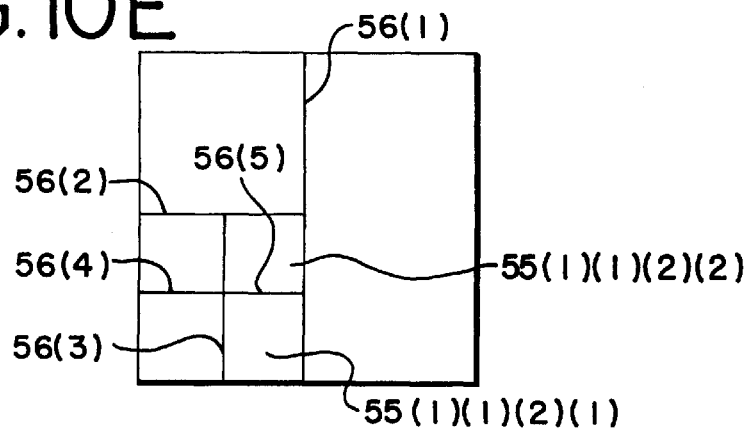

LAYER 0 ROUTING DATA BEFORE FINAL SPLIT:

SPLIT CREATING TWO LAYER 0 ROUTING PARCELS:

NEW DATA TYPE: FIRST CUT OF BOTTOM RECTANGLE CAN BE AT ANY OF SEVEN POSITIONS:

267(1), 267(2), 267(3), 267(4), 267(5), 267(6), 267(7)

NEXT CUT AT BOTTOM RIGHT CAN BE AT ANY OF FIVE POSITIONS:

265(1)(1), 265(1)(2)

267(2), 267(3), 267(4), 267(5), 267(6), 267(7)

NEXT CUT AT TOP RIGHT IS FORCED:

NEXT CUT AT TOP LEFT IS FORCED:

FIG. 16
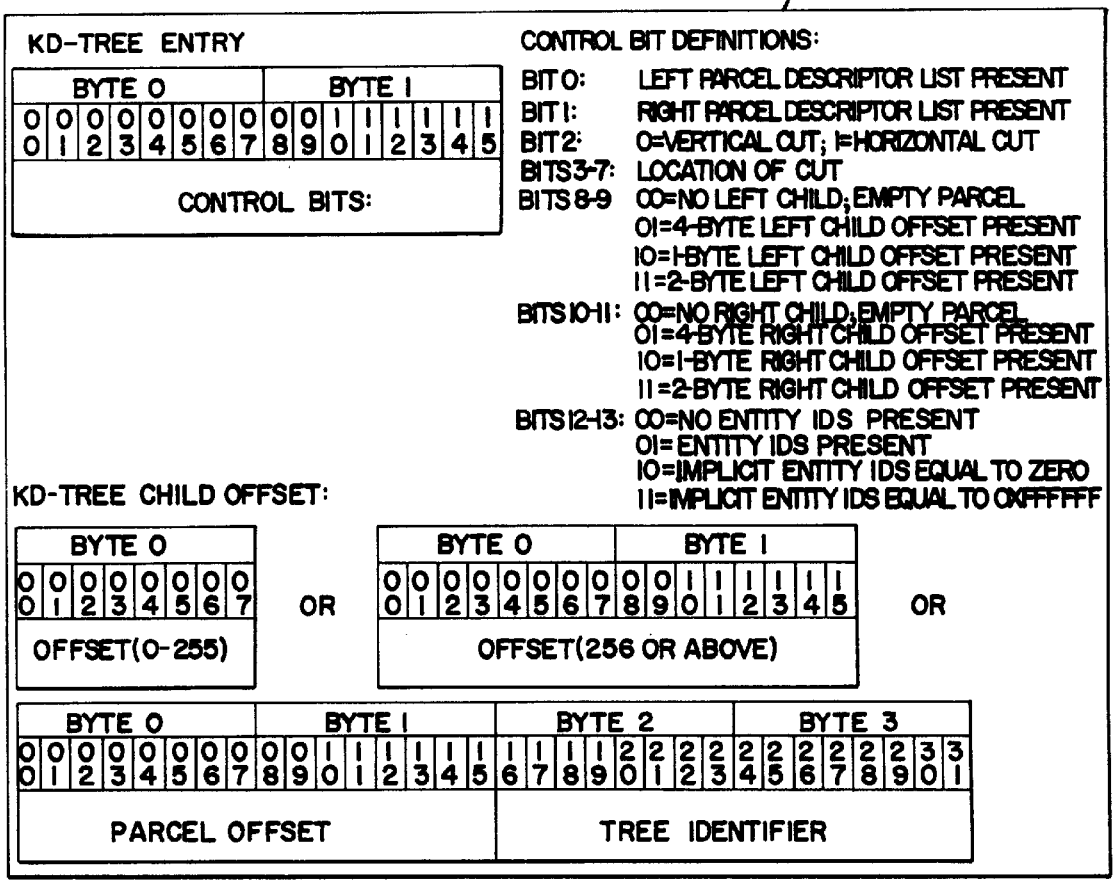
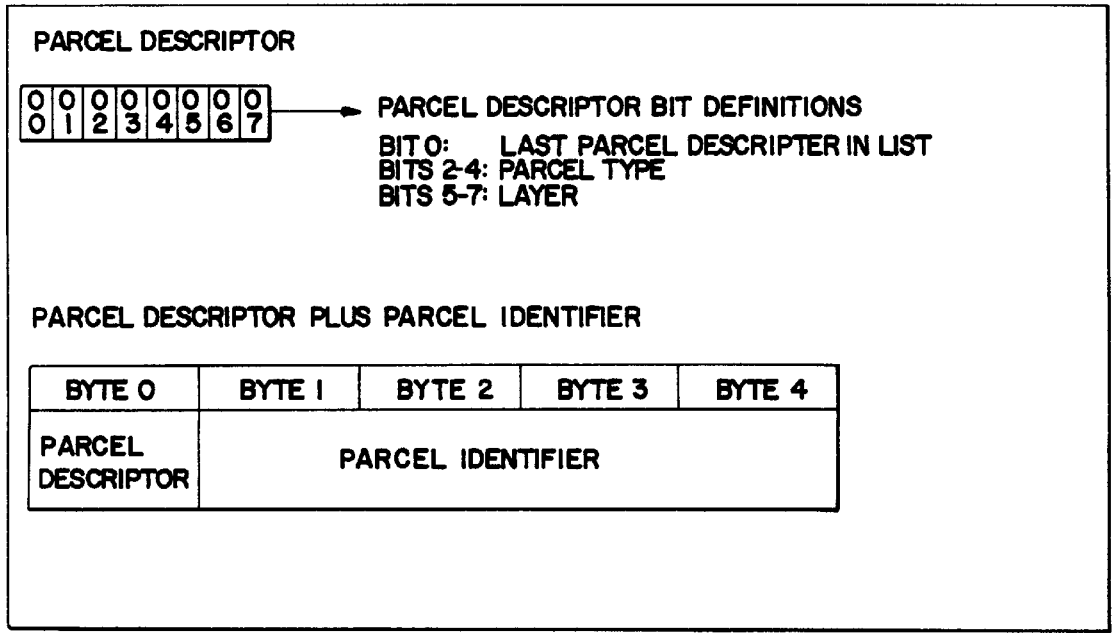

5,953,722

METHOD AND SYSTEM FOR FORMING AND USING GEOGRAPHIC DATA

REFERENCE TO RELATED APPLICATIONS

The present application is a continuation-in-part of Ser. No. 08/740,295 and Ser. No. 08/740,298, both filed Oct. 25, 1996, the entire disclosures of which are incorporated by reference herein.

BACKGROUND OF THE INVENTION

The present invention relates to a system and method for facilitating access to and use of geographic data used with a navigation application program that provides navigating features and functions to a user, and more particularly, the present invention relates to a method and system for organization, storage and retrieval of geographic data that facilitates use of the geographic data for various navigating functions provided by a navigation application program.

Computer-based navigation application programs are available that provide users with various navigating functions and features. For example, some navigation application programs are able to determine an optimum route to travel by roads between locations. Using input from a user, and optionally from equipment that can determine one's physical location (such as a GPS system), a navigation application program can examine various routes between two locations to determine an optimum route to travel from a starting location to a destination location in a geographic region. The navigation application program may then provide the user with information about the optimum route in the form of instructions that identify the maneuvers required to be taken by the user to travel from the starting location to the destination location. If the navigation system is located in an automobile, the instructions may take the form of audio instructions that are provided along the way as the user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program requires one or more detailed databases that include data which represent physical features in a geographic region. The detailed database may include data representing the roads and intersections in a geographic region and also may include information about the roads and intersections in a geographic region, such as turn restrictions at intersections, speed limits along the roads, the locations of stop signs, street names of the various roads, address ranges along the various roads, and so on.

One difficulty in providing geographic data for use by a navigation application program relates to the efficient utilization of the available computer resources of the navigation system on which the navigation application program is run. Computer-based navigation application programs are provided on various platforms including some with relatively limited computer hardware resources. For example, navigation systems may be located in vehicles or may be hand-held. These types of navigation systems typically have relatively limited computer resources, such as limited memory and relatively slow I/O. In order to provide a high a level of functionality in such systems, it is required that the available computer resources be used efficiently.

Given the relatively large size of the geographic database necessary to provide a desired level of navigating functionality to the user, it is accepted that all the data records for an entire geographic region cannot be loaded into the memory of the navigation system at the same time. This is especially true for navigation system platforms with limited resources, such as systems installed in vehicles or hand-held systems. Due to the limited memory resources of these navigation systems, it is necessary to load geographic data as needed from a storage medium, such as a CD-ROM, into the memory of the navigation system for use by the navigation application program. Unfortunately, as mentioned above, in these types of systems, I/O access from a storage medium is also likely to be relatively slow. Thus, the relatively limited memory resources combined with the relatively slow I/O can limit the performance of some types of navigation systems, resulting in slow response. Aside from being undesirable, slow response in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, it is important that navigation systems operate efficiently in order to provide navigating information relatively quickly.

Navigation application programs may also be run on computer platforms that have in general greater memory resources and faster I/O, such as personal computers or on networks. Although these systems may have more and faster resources, the considerations related to the efficient use of geographic data still apply, but on a larger scale. With these types of systems, even greater functionality can be provided if the limitations imposed by memory size and I/O are minimized.

Accordingly, it is an objective to provide navigating information quickly and efficiently in a navigation system.

It is a further objective to minimize I/O and maximize memory utilization in a navigation system.

SUMMARY OF THE INVENTION

To address the above concerns, the present invention provides a system and method for making and using a geographic database. The geographic database represents a geographic region and is used with a navigation application program. The geographic database includes a plurality of data entities each of which represents a physical feature in the geographic region. The plurality of data entities are separated into a plurality of parcels each of which contains a grouping of data entities that represent features in the geographic area encompassed within a separate one of a plurality of rectangles which together encompass all the features in the entire geographic region represented by all of the plurality of data entities. Each of the plurality of data entities has a data entity ID. The data entities contained in each of the plurality of parcels define an associated range of data entity ID's associated with their respective parcel such that the range of data entity ID's associated with each parcel does not overlap the range of data entity ID's associated with any another of the plurality of parcels. Associated with the geographic database is a searchable kd-tree structure whose nodes represent divisions of the geographic region into the rectangles from which the parcels are formed. The kd-tree structure permits spatial searching for a parcel based upon geographic coordinates. The kd-tree also includes data at certain of its nodes that identify the ranges of data entity ID's included in parcels formed from rectangles resulting from the divisions thereby enabling the kd-tree to be used as a binary tree for performing searches using the data entity ID's. This feature facilitates cross referencing from the data whose entity ID's are included in the kd-tree and also can be used to reduce memory requirements to store such data. Navigation application program functions can search for data by utilizing the kd-tree to conduct either a spatial search using geographic coordinates or a binary search using a data entity ID.

BRIEF DESCRIPTION OF THE DRAWINGS

FIG. 9 is a diagram similar to FIG. 7 illustrating a data arrangement derived from the parcelization method shown in FIG. 8.

FIGS. 10A–10E illustrate steps for parcelizing the data according to the method shown in FIGS. 8 and 9.

FIG. 16 is a diagram illustrating the data associated with a kd-tree node in the kd-tree illustrated in FIG. 15.

DETAILED DESCRIPTION OF THE PRESENTLY PREFERRED EMBODIMENTS

I. General

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the systems that use the data. Based upon the manner in which the geographic data are stored, arranged, and/or structured, functions in the navigation application program that access the data can implement routines that exploit the improvements incorporated into the geographic data. This combination can result in overall improved performance by the navigation system.

Figure 1:
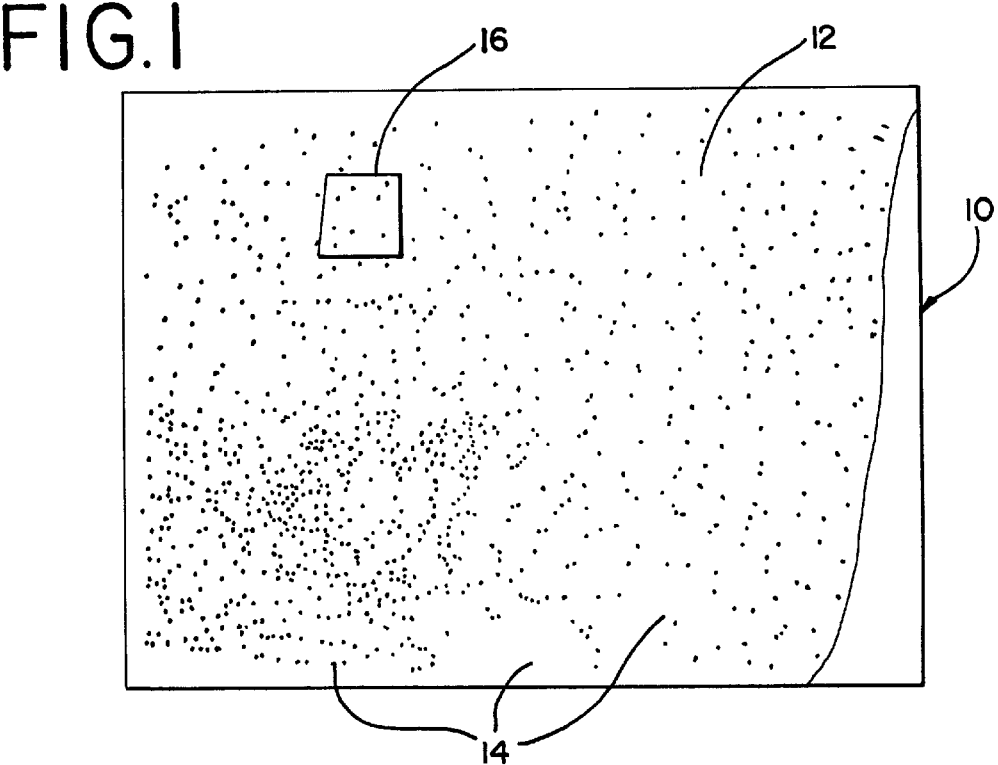
FIG. 1 illustrates a map showing a geographic region.
Figure 2:
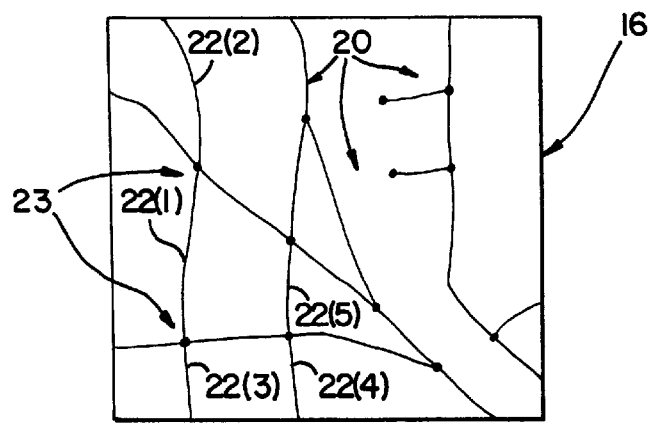
FIG. 2 shows an expanded view of a portion of the map of FIG. 1.
Figure 3:
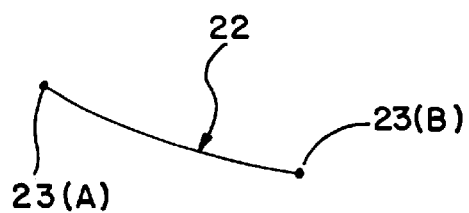
FIG. 3 is an illustration of a single road segment shown in the map of FIG. 2.

FIG. 1 illustrates a map 10 showing a geographic region 12 and FIG. 2 shows an expanded view of a portion 16 of the map 10. The portion 16 in FIG. 2 illustrates part of the road network 20 in the geographic region 12. The road network 20 includes, among other things, roads and intersections located in the geographic region 12. As shown in FIG. 2 in the illustrated portion 16 of the map 10, each road in the geographic region 12 is composed of one or more segments, 22(1), 22(2) . . . 22(n). In one embodiment, a road segment represents a portion of the road. In FIG. 2, each road segment 22 is shown to have associated with it two nodes 23: one node represents the point at one end of the road segment and the other node represents the point at the other end of the road segment. A single road segment 20 and its two associated nodes 23(A) and 23(B) are illustrated in FIG. 3. The node at either end of a road segment may correspond to a location at which the road meets another road, e.g. an intersection, or where the road dead ends. (An intersection may not necessarily be a place at which a turn from one road to another is permitted, but represents a location at which one road and another road have the same latitude and longitude.)

In one type of geographic database, there is at least one database entry (also referred to as "entity" or "record") for each road segment in a geographic region. This road segment data record may have associated with it information (such as "attributes", "fields", etc.) that allows identification of the nodes associated with the road segment and/or the geographic positions (e.g. the latitude and longitude coordinates) of the two nodes. In addition, the database road segment record may have associated with it information (e.g. more "attributes", "fields", etc.), that specify the speed of travel on the portion of the roadway represented by the road segment record, the direction of travel permitted on the road portion represented by the road segment record, the name of the road represented by the road segment record, what if any turn restrictions exist at each of the nodes which correspond to intersections at the ends of the road portion represented by the road segment record, street address ranges of the roadway represented by the road segment record, and so on.

Several navigation application functions require identification of a road segment data record based upon the physical location of the portion of the road in the geographic region which is represented by the road segment data record. Therefore, the geographical position of the portion of the road represented by the road segment data record is associated with the database entity for the road segment data record. In one embodiment, the location of the road segment is identified by the positions of its nodes. By convention or design, one of the two nodes associated with the road segment may be used to identify the location of the road segment, although both nodes or some other arrangement may be employed. The road segment data record may have associated with it attribute information that allows identification of its nodes.

In a geographic database that represents the region 12, there may also be a database entry (entity or record) for each node in the geographic region. The node data record may have associated with it information (such as "attributes", "fields", etc.) that allows identification of the road segment (s) that connect to it and/or its geographic position (e.g. the latitude and longitude coordinate).

Referring again to the map of FIG. 1, a plurality of locations 14 are shown to be located in the geographic region 12. Each of the locations 14 represents a place or point in the geographic area 12 at which there is located a feature about which it is desired to include information in a geographic database. Each of these locations 14 has a unique physical location (latitude, longitude, and optionally absolute or relative altitude) and each of the locations 14 can be uniquely identified by its two dimensional (or three dimensional) geographic coordinates, (i.e., latitude, longitude, and optionally altitude). A location 14 may correspond to one of the nodes located at the end of road segment data entity, or may correspond to a point-of-interest, such as a hotel or civic center, or may correspond to a point along a road segment at which the direction of the road changes. The locations 14 may represent anything physically located in the geographic area 12.

a. Separate Subsets of Data

One way that the accessing of geographic data can be enhanced for performing various navigation functions is to provide separate collections or subsets of the geographic data for use by each of the separate functions in the navigation application program. Each of these separate subsets is tailored specifically for use by one of the functions. For instance, the route calculation function normally uses only a portion of all the information in the geographic database that is associated with a segment of a road. For example, when the route calculation function is being run, it may require information such as the speed along a road segment, turn restrictions from one road segment to another, stop lights at intersections of road segments, and so on. However, the route calculation function does not normally require the name of the road to calculate an optimum route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the maneuver function is being run, some of the information associated with a segment of a road, such as the speed and turn restrictions, is not required. Instead, when the maneuver function is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

Figure 4:
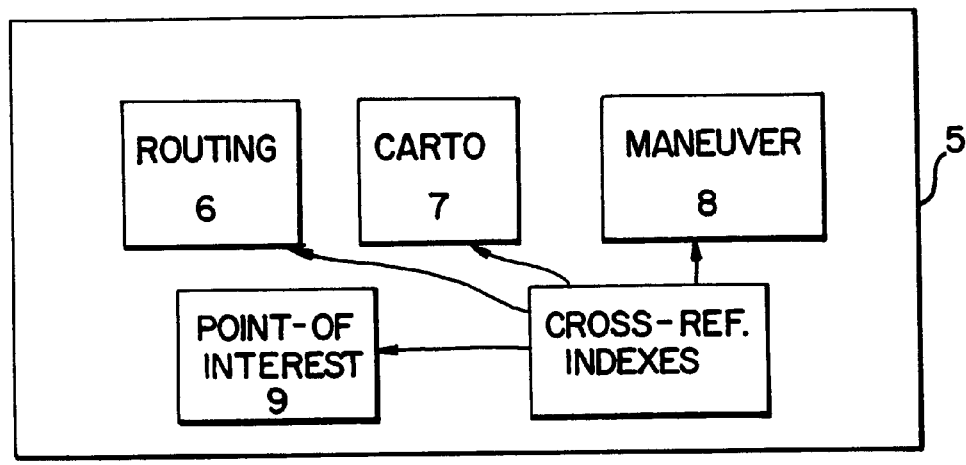
FIG. 4 is a diagram illustrating a geographic database for the geographic region illustrated in FIG. 1 and having separate subsets of data for use with navigation application programs.

In order to provide the information in the geographic database in a format more efficient for use by each of the navigation functions, separate subsets of the entire geographic database for a given geographic region are provided for each of the different types of navigation functions to be provided in the navigation application program. FIG. 4 illustrates a geographic database 5 comprised of separate routing data 6, cartographic data 7 (for map display), maneuver data 8, and points-of-interest data 9. A geographic database may be defined with fewer or more subsets than these, and other types of data may be defined and included.

Each subset of data includes only the data required to be used by a particular navigation function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in an larger overall data storage requirement, each of the navigation programs benefits from the resultant efficiency of handling smaller amounts of data.

Providing for separate subsets of geographic data for each of the navigation programs also takes into account that usage of each of these navigation functions relates to the others of the navigating functions in expected ways. For example, a user will often first want to view a present position, then enter a destination, then receive instructions how to start toward the destination, then observe a map showing the initial portion of the route, then receive further instructions, then have a map displayed of the next portion of the route, and so on. Because of these type of expected usages, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after a user obtains a calculated route, it may be desired to display a map on a computer display with the calculated route highlighted. In order to accomplish this, the routing subset of geographic data is accessed first to obtain the routing road segment data entities for the optimum route, and then the cartographic subset of the geographic database is accessed to obtain the cartographic road segment data entities corresponding to the routing data entities. To permit these data subsets to work together, cross referencing indexes 11 may be provided, or other search techniques may be provided, as explained below.

b. Layering of Data

Another way that the geographic data can be organized to enhance their use is to provide the data in layers. Some of the navigation functions use the data at different levels of detail. The map display function is an example of this type of function. When using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data, the geographic data are provided in separate collections or groups corresponding to separate layers.

Figure 5:
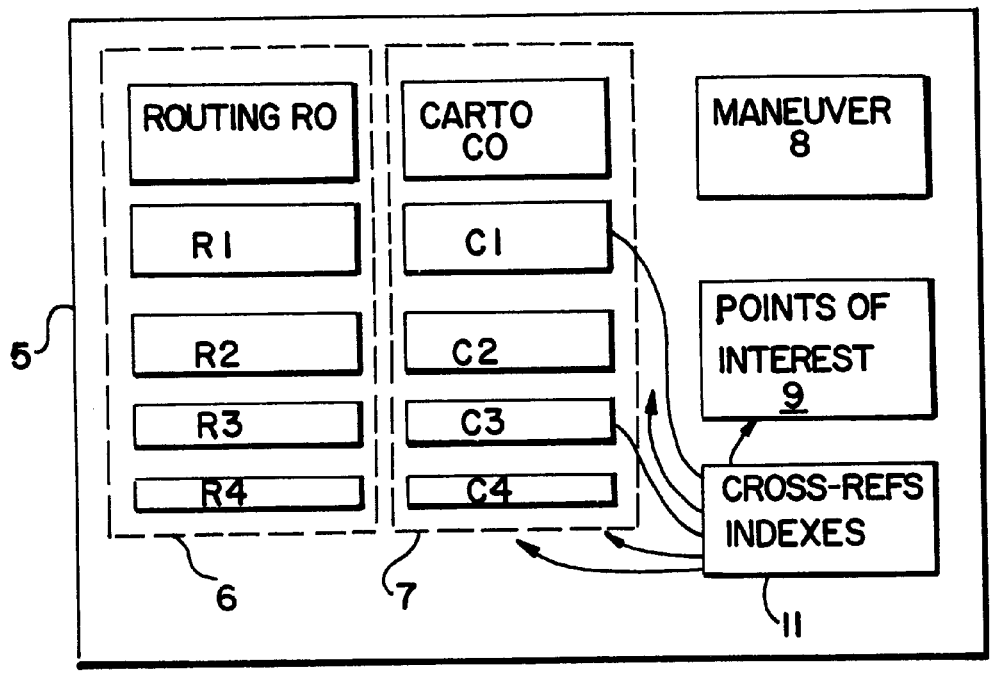
FIG. 5 is a diagram similar to FIG. 4 illustrating both separate subsets of data types and separate layers of data in some of the types.

To implement layering, data entities, such as road segment data entities, are provided with a "rank." The "rank" of a road segment may be related to its functional class with road segments having a rank of "0" being slowest and narrowest, road segments having a rank of "1" being larger and faster, road segments having a rank of "2" being major roads, and so on. The "rank" of a segment data entity also specifies the highest data layer in which a road segment entity exists. For example, referring to FIG. 5, the route calculation subset of geographic data 6 may include five separate collections of the data, R0, R1, R2, R3, and R4, each with a different level of detail, which can be used by the route calculation function. Similarly, the cartographic subset of geographic data 6 may include five separate collections of the data, C0, C1, C2, C3, and C4, each with a different level of detail, which can be used by the map display function.

In the routing subset of the geographic database, layer 0 (R0) includes segment data entities corresponding to all the portions of all the roads in the geographic region. Level 1 of the routing data comprises a separate subset (or collection) of the routing data and includes only the routing segment data entities (and their corresponding routing data attributes) having a rank of level 1 or higher. Level 2 of the routing data comprises a separate subset of the routing data and includes only the routing segment data entities (and their corresponding navigation data attributes) having a rank of level 2 or higher, and so on.

Similarly, the cartographic subset of geographic data may include separate collections (layers) of the data used by the map display function, each with a different level of detail. In the cartographic subset of the geographic data base, layer 0 includes segment cartographic data entities (and corresponding data attributes) corresponding to all the portions of all the roads in the geographic region. Level 1 of the cartographic data comprises a separate subset of the cartographic data and includes only the cartographic segment data entities (and corresponding data attributes) having a rank of level 1 or higher, and so on. Using these different layers of cartographic data, the map display function can provide rapid panning and zooming.

Although the organization of some of the data into layers results in a duplication of some of the data, the increased efficiency provided by layering of some of the data generally offsets any disadvantages. As with the use of separate types of data mentioned above, the need arises to allow these layers to work together. Cross referencing indexes 11 may be provided, or other search techniques may be provided, as explained below.

C. Spatial Access

Organizing the data into subsets or types and layering the data of some of the types provides separate collections of the data in sizes that are more manageable by each of the navigation functions. With respect to each subset and each layer of data, the data can be further organized to facilitate spatial access.

Several of the navigation functions provided in a navigation system may require access to the geographic data spatially. One way this arises is that a function in a navigation application program requires finding a record, such as a data entity, in a geographic database given the physical location in the geographic region of the geographic feature represented by the data entity. The data entity may be a road segment record that represents a portion of a road in the geographic region and the function may require finding the road segment record based upon the physical location in the geographic region of the portion of the road represented by the road segment record. Another way spatial access arises is when a function in a navigation application program requires finding several or all of a type of data records located close to a location in the geographic region or within a defined area in the geographic region. For example, a function may require all road segment records encompassed within a rectangle defined by geographical coordinates (x, x+n) latitude and (y, y+m) longitude.

The map display function, mentioned above, is a function of the type that may access geographic data spatially. The map display function may display a selected portion of the geographic region on a display screen. In order to generate such a map from a collection of database entities (or records) that represent portions of roadways in the geographic region, it is typically required to load into memory all of the road segment data entities corresponding to the portions of roadways in the selected portion of the geographic region. The data entities corresponding to the portions of roadways in the selected portion of the geographic region may need to be accessed from the data storage medium upon which the geographic database for the entire region is stored. If the road segment data entities corresponding to the selected portion of the geographic region which is desired to be displayed are located at various places on the storage medium on which the geographic database is stored, a large number of disk accesses might be required to obtain all the necessary records. This can result in relatively poor performance. Accordingly, to avoid this disadvantage, in general it is desired to locate together on the storage medium (for minimum disk accesses) data records that correspond to geographic features that are physically proximate to each other in the geographic region.

Another of the navigation functions that may be included in the navigation system is route calculation. This function provides a user of the system with an optimum route for traveling from one location in a geographic area to a destination location. In order to determine the optimal route, the route calculation function requires access to road segment data entities to determine certain data attributes, such as speed limits, turn restrictions, and so on, associated with the road segment data entities along the various possible routes between the starting location and the destination location. As with the map display function, mentioned above, the route calculation function requires access to road segment records spatially, i.e. based on the locations of the portions of the roadways in the geographic area to which the data entity records correspond. For example, as part of the route calculation procedure, when the route calculation function determines the optimum road to take from an intersection, it may access all the roads that lead from the intersection. Thus, all the road segment records that represent portions of roadways that meet at the intersection are accessed and examined. Like the map display function, the route calculation function requires that the road segment records be accessed by locations in the geographic area of the roadways to which they correspond.

Another function provided by navigation systems is maneuver generation. This function provides the user of the navigation system with instructions for traveling from one location to a destination location, based upon the optimum route calculated by the route calculation function. Given a list output from the route calculation function that identifies the road segment records corresponding to portions of roadways for traveling from one location in the geographic region to a destination location in the geographic region, the maneuver generation function provides the user with a series of maneuver instructions. As part of the maneuver generation function, the names of the roads are found that correspond to the road segment records identified in the list calculated by the route calculation function. Depending on the way the information is stored in the geographic database, it may be necessary to access the road segment records based on the locations of the portions of roadways which they represent to identify the corresponding locations in the geographic database that includes the names of the roads in order to provide the maneuver instructions.

As demonstrated above, these functions in a navigation application program, and possibly other functions in navigation systems, require accessing data records spatially, i.e. based on the locations of the features in the geographic region to which the records correspond. Further, as suggested by the above examples, some functions in a navigation application program may require accessing a group of data records that correspond to features in a geographic area that are spaced together relatively closely in the geographic region.

Assuming that all the data records for a given entire geographic region cannot be loaded into memory at the same time due to limited memory resources of the navigation system in which the navigation application program is being run, it would be desirable to load into memory only those data that are needed. Since some of the navigation functions require accessing data spatially, it would be advantageous to provide a means to load data into memory based generally upon the physical geographic locations of the features which the data represent or upon the geographical proximity of the features which the data represent. This can be done by parcelizing the data so that they are organized in the database and/or on the medium based upon the geographic locations of the features which are represented by the data. Different method for parcelizing geographic data are described below.

II. Parcelization

There are several factors that can affect the operation and performance of a navigation application program when using geographic data. In order to provide a reasonably high level of functionality, a relatively large database may be provided. Storage media, such as CD-ROM or PCMCIA cards, are capable of handling databases of the size and complexity sufficient to provide suitable functionality. However, accessing these types of media can be relatively slow. Because navigation systems may be installed in vehicles, or may be hand-held, the hardware resources of the navigation system may be limited. Navigation systems installed in vehicles or hand held units may have limited memory resources and relatively slow media access rates.

a. First Parcelization Procedure

As mentioned above, it is sometimes desirable to store the data representing the roads and intersections based upon the physical proximity of the physical features that they represent. In order to accomplish this, such data are organized into parcels with each parcel of data including data which represent features which are located physically proximate to each other in the geographic region. A parcel of data is established to be the smallest quantity of data that can be accessed at a time. This may relate to the quantity of data that can be accessed in a single disk access, although it may be related to some other factor. For some types of media such as a CD-ROM, a parcel may be established to a 16 Kilobyte quantity of data. (Other sizes of data may be used including 1K, 2K, 4K, 8K, 32K, and so on.)

(For purposes of forming the data into parcels, the data are first separately organized into the different types, as described above, based upon the functions that access them, such as routing, map display, and maneuver generation. Further, the data are also organized into layers, as mentioned above, based upon rank. Therefore, this description of parcelization refers to the level 0 routing data although it is applicable to other types and levels of data as well.)

Figure 6:
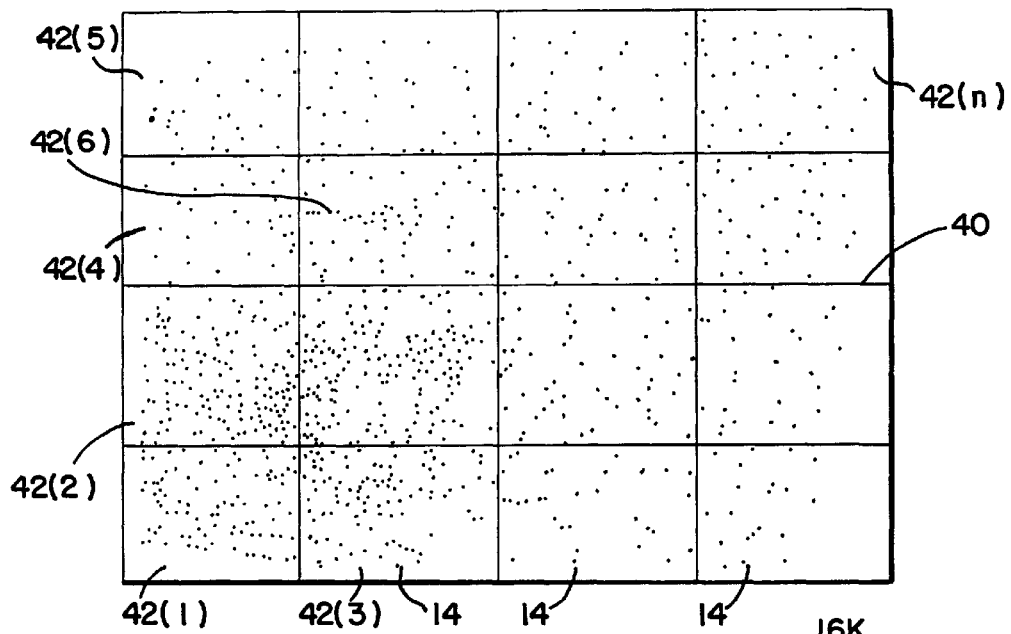
FIG. 6 shows the map of a geographic region illustrating a step in a first parcelization method.
Figure 7:
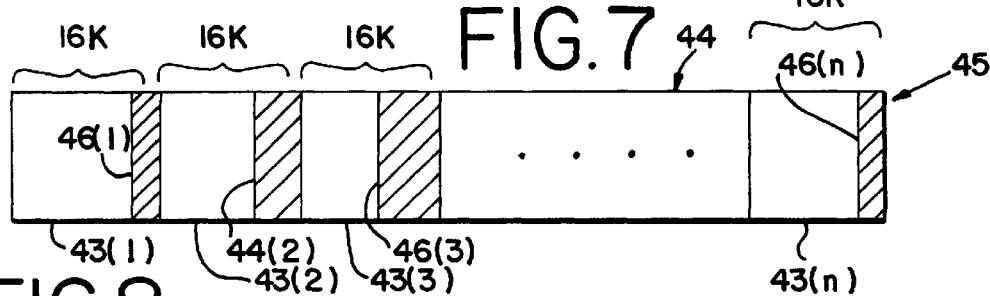
FIG. 7 is a diagram illustrating a data arrangement derived from the parcelization method shown in FIG. 6.

A relatively simple parcelization procedure is graphically illustrated in FIGS. 6 and 7. FIG. 6 shows the map 10 of the geographic area 12 overlaid by a grid 40 of rectangles 42(1), 42(2) . . . 42(n). In FIG. 6, each of these rectangles 42 is shown to be of the same size. As further shown in FIG. 6, each of the rectangles that forms the grid encompasses some of the points 14 in the geographic area 12 for which there are corresponding records (e.g., node and segment records) in the geographic database. As illustrated in FIG. 7, the grouping of data records corresponding to the features encompassed within each rectangle is included in a separate parcel 43(1), 43(2) . . . 43(n) of the data. The data in each parcel are stored contiguously in a database 44 and/or on a media 45 so that all the records in a parcel can be retrieved with one access of the medium.

In order for the parcelization procedure illustrated in FIG. 6 to work, it is required that the rectangles 42 be small enough so that none of them includes more data than a predetermined maximum parcel size which is a function of the hardware resources of the navigation system and the medium. In some present navigation systems, the amount of data that can be efficiently accessed in a single read access of the disk is 16K, and therefore, the size of the rectangles of the grid is selected so that none of them encompasses more features for which records are included in the database having a size exceeding 16K. To the extent that the data corresponding to features encompassed within any rectangle is less than the maximum parcel size, the remainder of the parcel is filled with padding, 46(1), 46(2) . . . 46(n), to make up the difference. (Padding may be used so that the size of the parcel conforms to the desired parcel size to facilitate memory management in a runtime parcel cache.)

The parcelization procedure illustrated in FIGS. 6 and 7 accomplishes the objective of grouping together geographic records so that geographic records can be accessed together that correspond to physical features that are located physically proximate to each other in the geographic region. A disadvantage of the procedure illustrated in FIGS. 6 and 7 is that data are not stored efficiently. In many geographic regions, such as the region illustrated in FIG. 6, the features are not uniformly spaced. Typically, in some parts of a region, the features are dense and in other parts the features are sparse. This has the result that some rectangles 42 encompass more features than other rectangles and as a consequence, some of the parcels 43 derived from the rectangles 42 have more data records than others. Parcels (e.g. 43(3) in FIG. 7) that correspond to sparsely-featured rectangles are required to include considerable padding (e.g. 46(3)) to make up the required parcel size. Since the size of these parcels relates to the minimum amount of data that is accessed in a single disk-read operation, a parcel corresponding to a rectangle in a sparsely-featured part of the region would contain only a relatively small amount of data. This leads to inefficient use of the medium, and limits the speed at which the functions in the navigation application program can obtain the required data.

Accordingly, it is preferred to provide a parcelization technique that takes into account that some parts of the region are more densely-featured than other parts. This can be accomplished by providing for feature-encompassing shapes (e.g. rectangles) that vary in size depending upon the density of the features to be encompassed. These shapes can then be used to define parcels of data that are generally close to, but do not exceed, a maximum parcel size (i.e. have a generally high fill percentage).

b. Second Parcelization Procedure

Figure 8:
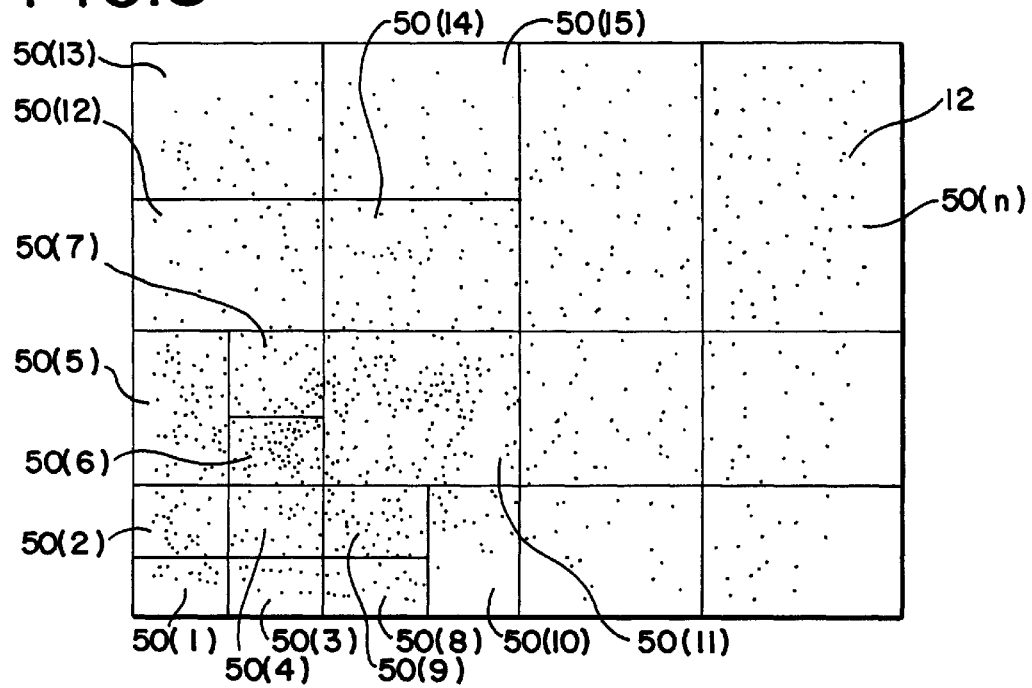
FIG. 8 shows a map of the same geographic region illustrated in FIG. 6 overlaid with rectangular divisions illustrating another parcelization method.

Another parcelization method is illustrated in FIGS. 8 and 9. FIG. 8 shows the map 10 of the geographic area 12 overlaid by a plurality of rectangles 50(1), 50(2) . . . 50(n). In FIG. 8, the rectangles do not necessarily have the same size. As in the previous embodiment, each of the rectangles 50 encompasses some of the points 14 in the geographic area 12 for which there are corresponding records (e.g., nodes and segment records) in the geographic database. The grouping of data records corresponding to the features encompassed within each rectangle is included in a separate parcel of the data, e.g. parcels 57(1), 57(2) . . . 57(n). As illustrated in FIG. 9, parcels 57 are stored contiguously in the database 44 and/or on the media 45, as in the embodiment of FIGS. 6 and 7, so that all the records in a parcel can be retrieved with one access of the medium.

In the parcelization process shown in FIGS. 8 and 9, the rectangles are formed in a manner that generally improves the fill percentage of data in each parcel, relative to the parcelization process shown in FIGS. 6 and 7. The parcelization process in FIG. 8 uses a series of bisections of the area of geographical region to form rectangles that encompass a quantities of data less than or equal the parcel size. Referring to FIG. 10A, starting with the entire geographic region 12, a first bisection of the region is made to divide it into two equal sized rectangular areas 55(1) and 55(2). The bisection may be made along either an east-west or a north-south axis. In FIG. 10A, a north-south dividing line 56(1) divides the region into the two rectangular areas 55(1) and 55(2). The quantity of data that represents features encompassed within each of these rectangles is examined. (It may be preferred that one of these rectangular areas is examined prior to the other. In the embodiment shown in FIGS. 8 and 9, the left (west) rectangle 55(1) is examined before the right (east) rectangle 55(2).) If the quantity of data in a rectangle is not greater than the maximum parcel size (e.g. 16 Kilobytes), a parcel is formed of the data that represents the features encompassed by the rectangle. However, if the quantity of data that represents the features encompassed by the rectangle is greater than the parcel size, the rectangle is bisected again.

In FIG. 10A, it was determined that the data representing the features encompassed within the rectangle 55(1) exceeded the maximum parcel size, and accordingly, the rectangle 55(1) is bisected as shown in FIG. 10B. As shown in FIG. 10B, the rectangle 55(1) is bisected by a line 56(2). It may be preferred that the direction of the bisecting lines alternate, so that if a first bisection (56(1)) is along a north-south axis, then the next bisection (if necessary) of rectangles formed by a north-south bisection, are made by east-west bisections. Alternating bisections avoids the formation of rectangles that have a high aspect ratio, which may result in the features being encompassed by a rectangle not being as close together as in a rectangle that has a small aspect ratio. Another reason to avoid the formation of rectangles having high aspect ratios is that such rectangles have relatively larger perimeters for a given amount of data encompassed. This results generally in more road segments overlapping the perimeter which require exceptional handling since they cross parcel boundaries.

In FIG. 10B, the bisection of the rectangle 55(1) forms two rectangles 55(1)(1) and 55(1)(2). The data representing the features encompassed within these rectangles are examined to ascertain whether they do not exceed the predetermined parcel size. If they do, then the rectangle is bisected again. This procedure is performed repeatedly until a rectangle is formed that encompasses features that are represented by data that do not exceed the predetermined maximum parcel size. As shown in FIG. 10D, a rectangle 55(1)(1)(1)(1) was formed by the line 56(4) which bisected a rectangle 55(1)(1)(1) which in turn was formed by a line 56(3) that bisected the rectangle 55(1)(1).

After a rectangle corresponding to a first parcel is identified, the data in the remainder of the geographic region are examined. There are alternative orders in which this can be performed. According to one approach, as mentioned above whenever two rectangles are formed by a bisection, one of the rectangles is examined first. By convention, if two rectangles are formed by a north-south bisection (such as rectangles 55(1) and 55(2) in FIG. 10A), the western-most rectangle (e.g. 55(1)) is examined first and if two rectangles are formed by an east-west bisection (such as rectangles 55(1)(1) and 55(1)(2) in FIG. 10B), the southern-most rectangle (e.g. 55(1)(2)) is examined first. (This convention is arbitrary and any other convention could be used.) Moreover, rather than examining an eastern rectangle formed by a north-south bisection for formation of a parcel at the time the bisection is made, if the western rectangle encompasses data that exceeds the predetermined parcel size, further bisections of the western rectangle are conducted until all the data represented by the features in it are entirely formed into parcels before any further bisections of the eastern rectangle are made. For example, after identification of the rectangle 55(1)(1(1)(1) as a parcel, the data encompassed by the rectangle 55(1)(1)(1)(2) are examined to ascertain whether they exceed the predetermined maximum parcel size. If they do not, the data encompassed by the rectangle 55(1)(1)(1)(2) are identified as corresponding to another parcel. As shown in FIG. 10D, the data encompassed within the rectangle 55(1)(1)(1)(2) did not exceed the maximum parcel size and a parcel was formed corresponding to the data encompassed with the rectangle 55(1)(1)(1)(2).

Following identification of a parcel corresponding to the rectangle 55(1)(1)(1)(2), the rectangle 55(1)(1)(2) is examined. This rectangle is examined because it was formed by the last bisection (i.e., 56(3)) which did not form a rectangle encompassing a sufficiently small amount of data to form a parcel. Examination of the data representing the features encompassed within the rectangle 55(1)(1)(2) in FIG. 10D determines that they exceed the maximum size for a parcel. Accordingly, as shown in FIG. 10E, the rectangle 55(1)(1) (2) is bisected by an east-west line 56(5) to form a rectangle 55(1)(1)(2)(1) and a rectangle 55(1)(1)(2 The rectangle 55(1)(1)(2)(1) is examined first and it is determined that the data representing the features encompassed in this rectangle do not exceed the maximum parcel size and therefore a parcel may be formed of the data. The rectangle 55(1)(1) (2)(2) is examined next, and it is determined that it too encompassed features represented by data that does not exceed the maximum parcel size and a parcel is formed of the data encompassed within the rectangle 55(1)(1)(2)(2).

The examination of rectangles continues in the manner described above and parcels are formed when a rectangle is sufficiently small so that it encompasses data that does not exceed the maximum parcel size. As described above, the examination of rectangles proceeds in a order based on two criteria: (1) a directional preference, and (2) a priority assigned by the bisection that formed the rectangle. Whenever a rectangle is divided, one of the resultant rectangles has a directional preference over the other: west prior to east if the division is by a north-south line and south prior to north for an east-west line (or vice versa). Any non-directionally-preferenced rectangle formed by a division is examined after the directionally-preferenced rectangle formed by the same division and all rectangles formed by any subsequent divisions of the directionally-preferred rectangle.

The procedure described above is used until all the data representing features in the entire geographic region are parcelized. This procedure has an advantage over the first parcelization procedure described above in that the rectangles formed by a series of bisections may result in parcels that in general have a greater fill percentage compared to those in the first version. Parcelization procedures that form parcels having an even greater fill percentage are described as follows:

c. Third Parcelization Procedure

A parcelization procedure that results in an even greater fill percentage of data in parcels is disclosed in Ser. No. 08/740,295, filed Oct. 25, 1996, the entire disclosure of which is incorporated by reference herein. The parcelization method is briefly described as follows:

As noted with respect to the second procedure for parcelization, described above, some of the parcels may not have a desired fill percentage. This occurs because a geographic region is usually not uniformly-featured. Some parts of a geographic region have more features than other parts and therefore there is more data in the database representing those denser parts of the region than the parts that are less densely-featured. The bisection of rectangles as in the second parcelization procedure above arbitrarily divides the data so that some rectangles may contain significantly less data than the maximum parcel size. Although the second parcelization method provides an improvement over the first parcelization method, it still results in some parcels being less than optimally full. This results in less than optimal performance since not as many data records are accessed when the parcel is significantly less than full.

The parcelization method described in the referenced application overcomes this disadvantage by using both a normal bisecting procedure and a special dividing procedure to parcelize the data. According to this approach, if the data representing the features encompassed in a rectangle are greater than a predetermined multiple of the maximum parcel size, the rectangle is bisected into two equal sized sub-rectangles, as in the second parcelization procedure described above. However, if the data representing the features encompassed in a rectangle are less than the predetermined multiple of the maximum parcel size, the rectangle is divided using a special division procedure that increases the likelihood that the parcels formed will have a desired fill percentage.

When data representing the features encompassed in a rectangle are less than a predetermined multiple of the maximum parcel size, trial divisions of the rectangle are examined at locations in addition to a division by bisection. In one embodiment, divisions are examined at ½ along the rectangle (i.e. a bisection), ¼ along the rectangle, ¾ along the rectangle, ⅛ along the rectangle, ⅜ along the rectangle, and so on, through ³¹⁄₃₂ along the rectangle. A division is selected so that further divisions will result in the minimum number of parcels being formed of the data.

The third parcelization procedure may start with a rectangle that encompasses the entire geographic region, or preferably, it starts with a plurality of starting rectangles defined by a regular grid which is overlaid on the region. Such a grid is formed so that a starting rectangle is the largest rectangle allowed such that the data representing the features encompassed therein are permitted to form a parcel. Using a regular grid to define starting rectangles facilitates parcelization since it is unlikely that any of the first several divisions of a rectangle encompassing the entire region will form rectangles small enough to form a parcel. Thus, overlaying a arid represents several bisections of the entire region.

Figure 11:
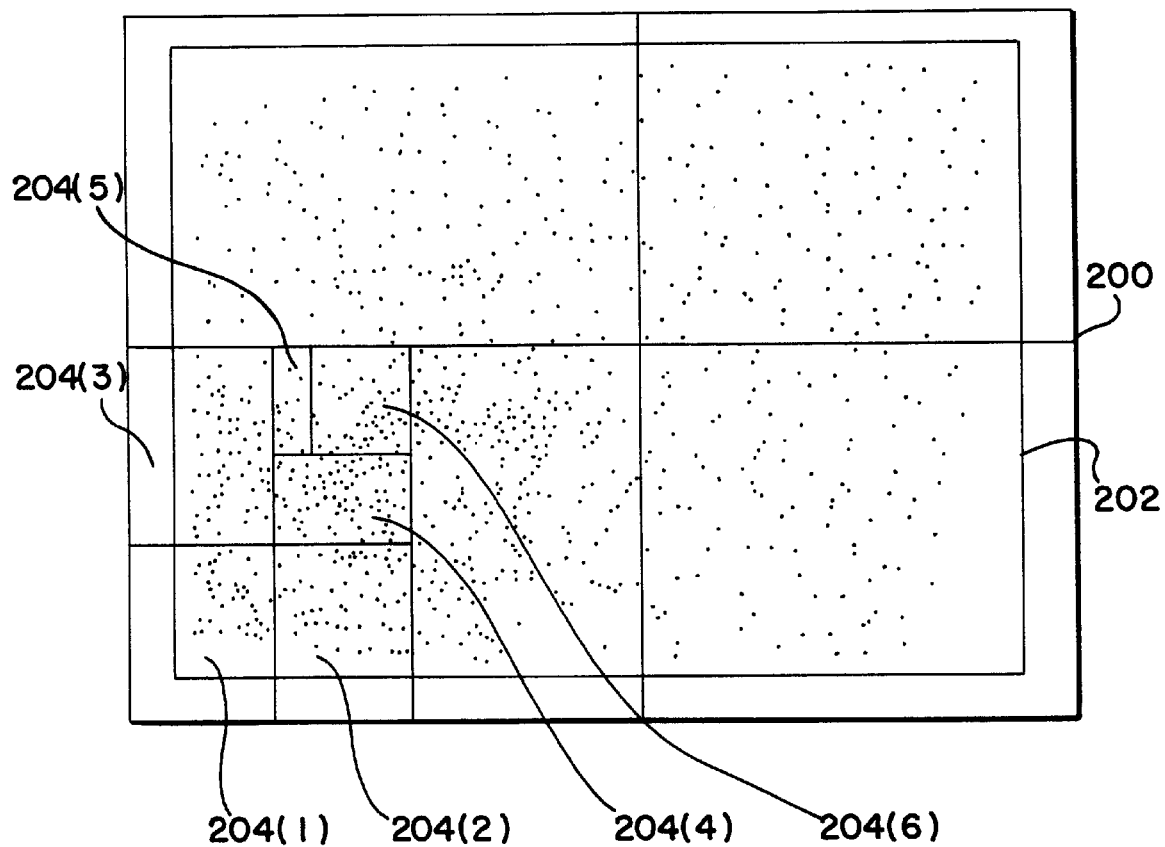
FIG. 11 shows a map of the same geographic region illustrated in FIGS. 6 and 8 overlaid with divisions illustrating another parcelization method.

This parcelization procedure uses a minimum enclosing dividable-tile ("di-tile") for purposes of determining the point at which a division of any rectangle (or sub-rectangle) is made. Referring to FIG. 11, in this parcelization method, a minimum enclosing di-tile 200 is determined that encompasses a minimum bounding rectangle 202. A di-tile refers to an area of dimensions 2I×2J that includes all map data between latitudes M×2I navigation units and (M+1)×2I navigation units and between longitudes N×2J navigation units and (N+1)×2J navigation units, where M and N are integers, and I and J are positive integers). The navigation units 1, 2, ... an so on, may represent units equal to ¹⁄₁₀₀,₀₀₀th of a degree. (To allow di-tiles to overlap "0", i.e. latitude or longitude equal to "0", di-tiles may also have dimensions between −2I, +2I, where I≧17.)

One way of determining a minimum enclosing di-tile is to define acceptable intervals and to require that the minimum enclosing di-tile have as its sides only acceptable intervals. Acceptable intervals are defined in both directions of latitude and longitude. (Any arbitrary starting location may be chosen, but in a preferred embodiment, acceptable intervals conform to conventional latitude and longitude starting locations, i.e. the equator and Greenwich.) Acceptable intervals may be defined to include only powers of 2, for example: 0-1, 2-3, 4-5, 6-7, ..., 0-3, 4-7, 8-11, 12-15, ..., 0-7, 8-15, 16-23, 24-31, ..., 0-15, 16-31, 32-47, 48-63, ..., and so on (in navigation units). Acceptable intervals include {M*2I, (M+1)*2I} where M∈Z (where M is a member of the set of all integers Z), I≧0, or acceptable intervals may also include {−2I, +2I} where I≧17 in order to obtain intervals that overlap latitude or longitude equal to 0.

In this embodiment, the sides of the minimum enclosing di-tile for the minimum enclosing rectangle are required to be acceptable intervals. Therefore, in this embodiment, the east-west coordinates of the initial di-tile are multiples of 2I units, and the north-south coordinates of the initial di-tile are multiples of 2J units. (I and J are integers so that the east-west length of the initial di-tile may have a dimension in units of 1, 2, 4, 8, 16, 32, 64, 128, 256, 512, or 1024, and so on, and the north-south length of the initial di-tile may have a dimension in units of 1, 2, 4, 8, 16, 32, 64, 128, 256, 512, or 1024 and so on, for example).

Once the minimum enclosing di-tile is established, the data can be parcelized. In one alternative, the parcelization process can begin by applying the regular division procedure, described below, to the minimum enclosing di-tile. Alternatively, the data in the coverage area are first examined based upon an organization of the data into a regular grid of rectangles formed from the minimum enclosing di-tile. This is equivalent to bisecting the minimum enclosing di-tile and then the rectangles (or squares) formed therefrom a number of times until a regular grid of rectangles results. Each of the rectangles in this grid may be referred to as an "initial tile" (corresponding to the "starting rectangle", above) The initial tile size is determined to be the largest geographic area allowed to be represented by one parcel at any layer of any of the types of data in the geographic database. In one embodiment, one fixed initial tile size is defined for all regions throughout the country so that regions can be more easily merged. In one present preferred embodiment, each of the initial tiles is of a fixed, predetermined size of 217 navigation units by 217 navigation units.

The placement of the boundaries of the grid is determined in order to include the region of the minimum bounding rectangle ("MBR") within a minimum enclosing di-tile. The MBR is the rectangle formed by the north-south line through the minimum longitude (corresponding to the easternmost node encompassed in the geographic region), the east-west line through the minimum latitude (corresponding to southern-most node encompassed in the geographic region), the east-west line through the maximum latitude (corresponding to northernmost node encompassed in the geographic region), and the north-south line through the maximum longitude (corresponding to the westernmost node encompassed in the geographic region). The grid boundaries are defined so as to correspond to the minimum enclosing di-tile when the grid is overlaid on the region. All the spatial data are encompassed and the initial tiles have a size as described above. In a preferred embodiment, the placement of the grid boundaries also conforms to the acceptable intervals, described above.

As mentioned above, a purpose of parcelizing the data is to include in each parcel an amount of data that is close as possible to, but not in excess of, a predetermined maximum parcel amount. For example, the predetermined maximum amount may be 16 Kilobytes.

Each one of the initial tiles in the grid is examined as a "trial parcel" to see if the amount of data in it fits into a single parcel. If the data within the "trial parcel", including any parcel overhead (such as index information and headers), would (accounting for data compression, if used) be less than or equal to the maximum parcel amount, then a parcel is constructed with that initial tile and no division of that initial tile for that particular data type is performed. On the other hand, any "trial parcel" that includes an amount of data that exceeds the predetermined maximum parcel amount is divided using one of the two following procedures as a function of the amount by which the data in the "trial parcel" exceeds the desired maximum amount. (In a preferred embodiment, an estimation technique, described below, is used in determining trial parcels. The estimation technique takes into account parcel overhead and compression without actually performing all the steps necessary to form a parcel.)

Regular dividing procedure. If the amount of data in a "trial parcel" exceeds the maximum parcel amount by a predetermined multiple, the "trial parcel" is divided into two rectangles. In a preferred embodiment, the division of the "trial parcel" into two rectangles is carried out by first determining the minimum enclosing di-tile for the trial parcel (in the manner described above with the initial tile), bisecting the enclosing di-tile, and then dividing the "trial parcel" where the line of bisection of the di-tile intersects the trial parcel. Alternatively the "trial parcel" may itself simply be bisected. (It is noted that a bisection of the enclosing di-tile will not always bisect the trial parcel, but instead may divide the trial parcel at an off-center location. For ease of reference herein, such division of the trial parcel will nonetheless be referred to as "bisection"). In either event, the line of bisection of the di-tile will be in either the longitudinal or latitudinal direction. In a one embodiment, the di-tile is bisected in whichever of the longitudinal or latitudinal divisions minimizes the maximum aspect ratio of the two resulting rectangles of the trial parcel.

Each of these resulting rectangles is then examined as a "trial parcel", as described above, and bisected if the data contained in it exceeds a predetermined multiple of the maximum parcel amount. Each of these sub-rectangles is also then examined as a "trial parcel", as described above, and the process continues until the amount of data in a rectangle or sub-rectangle is less than the predetermined multiple of the maximum parcel amount. The predetermined multiple is chosen based upon a desired minimum fill percentage for each parcel. In one embodiment the desired minimum fill percentage is 80% and the predetermined multiple is 3.2 which can be derived from the following table (where D is an unacceptable data size and P is the maximum parcel size):

Table of unacceptable sizes D
$0<D<0.8\times P$
$P<D<1.6\times P$
$2\times P<D<2.4\times P$
$3\times P<D<3.2\times P$ The list stops at this point, because the next entry would be the empty range
$4\times P<D<4\times P$ In one embodiment, the maximum parcel amount is predetermined to be 16 Kilobytes of data. (In alternative embodiments, the maximum amount may be predetermined to be another amount greater than or less than 16K, such as 8K or 32K, or even amounts greater or less than these). Thus, "trial parcels" are bisected according to the regular procedure when their data content exceeds 51.2 kilobytes. When the amount of data in any trial parcel is less than the predetermined multiple amount, further subdivisions of the trial parcel follow the "custom division procedure", described below.

Custom division procedure. If the amount of data in any "trial parcel" exceeds the maximum parcel amount, but is less than the predetermined multiple of the maximum parcel amount (e.g., 16 Kb<x<51.2 Kb), the following custom division procedure is used: Further divisions of the "trial parcel" are not necessarily bisections, but rather are made in a manner that tends to minimize the number of parcels created. This has the effect of minimizing both the space needed to store the parcels and wasted space within the parcels.

For example, given a trial parcel that contains data equal to 3.6 times the maximum parcel size or amount, it should be possible to fit this data into four parcels. However, bisection of the trial parcel may divide it into two rectangles of 1.2 times the maximum parcel size and 2.4 times the maximum parcel size, respectively, which would then end up in a minimum of five parcels if bisection were used to divide each of the rectangles. Therefore, subdivisions of the rectangle at this stage are made with the goal of minimizing the number of parcels created, but with the restriction that the division line not be arbitrary. More particularly, where a "trial parcel" has a data content that is greater than the maximum parcel size, but not in excess of the predetermined multiple thereof, the "trial parcel" is divided at a division of 2-x along one of its dimensions. In a present preferred embodiment, $X=\{1,2,3,4,5\}$. Thus, the trial parcel is divided at ½ or ¼ or ⅛ or ¹⁄₁₆ or ¹⁄₃₂ divisions of its width. For example, a trial parcel may be divided into two rectangles with widths equal to ⅝ and ⅜, respectively, of the width of the trial parcel. This custom division may be applied directly to the dimensions of the trial parcel, or, in a present preferred embodiment, it may be applied to the dimensions of, a minimum enclosing di-tile of the trial parcel. In the latter case, the trial parcel is divided where the division line of the di-tile intersects the trial parcel. In either event, the division line will be in either the longitudinal or latitudinal direction.

Candidate division lines are examined as follows: First, divisions are made at each of the specified 2-x divisions along both the longitudinal and latitudinal widths of the trial parcel. For each such division, the aspect ratios (defined as the ratio of the larger dimension to the smaller dimension) of each of the two resulting rectangles are determined, and the greater of the two is identified. The greatest aspect ratios identified for each of the candidate division lines are then compared, and the candidate division lines are ordered from smallest to greatest of such aspect ratios. The rectangles resulting from the candidate division lines are then examined, beginning with the first candidate line in the ordered list. The candidate division line chosen for dividing the trial parcel is the first one in the list encountered where the data content in one of its two resulting rectangles is less than or equal to a multiple (such as two times) of the maximum parcel size and greater than or equal to a minimum fill percentage times such amount. For example, the division line is chosen to include in one of the resultant rectangles an amount between 1.6 and 2.0 times the maximum parcel amount. This should enable making one more division of the rectangle to form two further sub-rectangles each with a fill percentage greater than 80% (0.8) of the maximum parcel amount. Each of these resultant sub-rectangles with a fill percentage between 80% and 100% of the maximum parcel amount is formed into a parcel. If no candidate division line meets this criterion, then the first candidate division line (i.e. the one with the smallest maximum aspect ratio) is used to divide the given rectangle.

EXAMPLE

The following describes how, during parcelization, a determination is made when to stop bisecting trial parcels, and to start the custom procedure of evaluating candidate divisions of 1/32, 1/16, 3/32, 1/8, 5/32, 3/16, 7/32, 1/4, 9/32, 5/16, 11/32, 3/8, 13/32, 7/16, 15/32, 1/2, 17/32, 9/16, 19/32, 5/8, 21/32, 11/16, 23/32, 3/4, 25/32, 13/16, 27/32, 7/8, 29/32, 15/16, and 31/32 along both the longitudinal and latitudinal widths of the trial parcel.

A target parcel fill percentage F is chosen. For the sake of example, let F be 0.8 (80 percent). As mentioned above, a maximum parcel size P is also determined. P is expressed in bytes and is the maximum amount of data that can be put into a parcel. Optimally, therefore, it is desired to create parcels in the range of F×P bytes and P bytes in size.

If a trial parcel having a data size D is in the range P<D<1.6×P, then it is not possible for parcels to be created therefrom whose data sizes fall in the target range. If the trial parcel is divided such that one resulting rectangle has a data size greater than or equal to 0.8×P, then the other one has a data size less than 0.8×P.

This process can be extended to give the list of non-acceptable data sizes in II the Table of Unacceptable Sizes, above. From the above list a complementary list of acceptable data sizes can be generated:

Table of Acceptable Data Sizes D:

0.8×P≦D≦P 1.6×P≦D≦2×P 2.4×P≦D≦3×P 3.2×P≦D

The above list corresponds to a fill percentage F equal to 0.8. Other fill percentages generate different lists of acceptable or unacceptable data sizes. In general, the list of unacceptable data sizes is in the following form:

Unacceptable Data Sizes D:

0<D<F×P

P<D<2×F×P

. . .

n×P<D≦(n+1)×F×P

. . .

continuing until an empty range is reached.

The above is used as follows in the custom procedure for forming the parcels: The data sizes of each of the two rectangles resulting from a trial parcel division should fall within one of the acceptable ranges (whenever possible). In practice, this means that as long as the data size in a rectangle is somewhat larger than the high end of the highest unacceptable range (3.2×P. in the example), the rectangle can be divided according to the above-described bisection procedure. Once the high end of the highest unacceptable range is approached, custom divisions (i.e., divisions of 1/32, 1/16, 3/32, 1/8, etc. in this example) are considered.

Candidate division lines are examined and compared in the manner described above, and the one selected for division is where the following criterion is met: The amount of data failing into each of the two sub-rectangles of the trial parcel is of a size such that it is theoretically capable of, in turn, being subdivided into rectangles that, on the average, achieve a specified minimum parcel data fill percentage. Some cases may occur in which the above criterion cannot be met.

The data are divided at the division line chosen in the custom division procedure, and, for each of the two sub-rectangles created, the custom division process is repeated as necessary. As mentioned above, the bisection and custom division procedure can be applied either directly to the trial parcel or to the minimum enclosing di-tile of the trial parcel, although the latter is preferred. It is noted that in some cases the minimum enclosing di-tiles are exactly equal to trial parcel boundaries. This may occur with respect to the initial tiles. The utility of defining the divisions in terms of the minimum enclosing tiles is that a tile can be repeatedly divided in half evenly, whereas a trial parcel rectangle of arbitrary dimensions cannot. Another advantage is that this procedure facilitates processing at boundaries between different databases. The custom division of a trial parcel at a 2-X division of the tile's side is equivalent to a sequence of from 1 to X bisections. Consequently, the division lines, and therefore the resulting sub-rectangles, can be represented in a minimal number of bits (5 bits for 1/32 divisions, as opposed to up to eight or sixteen bytes to define an arbitrary rectangle).

(In examining amounts of data included in rectangles, a convention is established that any data entity that is located exactly on a dividing line is included with the data in the rectangle "to the right" ("east") of the line, if the dividing line is a north-south line, and with the data "above" ("north of") the line, if the dividing line is an east-west line.)

The above procedure is performed on all the initial tiles (and, where necessary, all resulting rectangles) in the grid.

d. Fourth Parcelization Version

A further procedure for parcelizing the data in a geographic region is disclosed in copending application Attorney Docket No. 7117-61 entitled "METHOD AND SYSTEM FOR PARCELIZATION OF GEOGRAPHIC DATA FOR STORAGE AND USE IN A NAVIGATION APPLICATION" filed on even date herewith, the entire disclosure of which is incorporated by reference herein.

This parcelization method is a further improvement and can be used in conjunction with the third parcelization procedure described in Ser. No. 08/740,295.

In the third parcelization method, it was proposed as an example that parcels at least 80 percent filled are desired. For a parcel size "P", a rectangle containing 2.7×P bytes of data can be divided in different ways. For example, it can be divided into two rectangles containing 1.35×P bytes of data each. Each sub-rectangle can then be divided into two sub-rectangles to obtain rectangles encompassing data less than the optimal parcel size, resulting in a total of four parcels averaging 68 percent filled. Alternatively, the initial division could be into sub-rectangles with a 1.8×P and 0.9×P bytes of data, and then the former sub-rectangle can be divided into two sub-rectangles of 0.9×P bytes each, for a total of three parcels 90 percent filled.

The decision made in the above example is based on a table of acceptable data size ranges according to the following table:

TABLE 1

| Minimum | Maximum |
| --- | --- |
| 0.8 × P | 1.0 × P |
| 1.6 × P | 2.0 × P |
| 2.4 × P | 3.0 × P |
| 3.2 × P | — |

In the third parcelization method, the above table is used to determine that a dividing line is acceptable based upon when it divides a rectangle into two sub-rectangles each of whose data sizes falls within one of the ranges above.

In many situations, the decision will also be constrained by the accuracy with which a data size of a parcel can be estimated before the parcel is created. If it is assumed that the data size can be estimated to within an accuracy of 4 percent, then to provide for parcels falling between 80 percent and 100 percent filled, without exceeding the optimum size, it is required to modify the above table to take a 4 percent error into account:

TABLE 2

| Minimum | Maximum |
| --- | --- |
| 0.84 × P | 0.96 × P |
| 1.68 × P | 1.92 × P |
| 2.52 × P | 2.88 × P |
| 3.36 × P | 3.84 × P |
| 4.20 × P | 4.80 × P |
| 5.04 × P | 5.76 × P |
| 5.88 × P | — |

However, in some situations dividing lines can be considered that produce sub-rectangles falling within acceptable ranges in the first table, but not the second table. Therefore, a hierarchy of two or more tables is used. In the example here, if a dividing line is found whose sub-rectangles fall within acceptable ranges in the second table, that dividing line would be selected. Otherwise, a dividing line whose sub-rectangles fall within acceptable ranges in the first table would be selected.

It could also happen that, for a particular dividing line, one sub-rectangle might be acceptable based on both the first and second tables, and the other acceptable based on the first table only. Each dividing line is therefore scored as follows: each of the two sub-rectangles are scored according to the tables its data size falls into, and the score of the dividing line is defined as the sum of the two sub-rectangle scores. In this example, a dividing line both of whose resulting sub-rectangles fall into a range in the second table would score highest, and a line both of whose sub-rectangles fall into a range in the first table but not in the second table would score lowest. The best dividing line is then selected using these scores.

Aspect ratio (the ratio between the sides of a rectangle) is also taken into account, as follows: For a given dividing line, the aspect ratio of each of the two sub-rectangles is determined, and the aspect ratio for the dividing line is defined to be the least desirable (largest) of the two sub-rectangle aspect ratios. Only dividing lines whose aspect ratios are smaller than a fixed maximum aspect ratio are considered qualified candidates. Of the qualified candidates, the one with the best score will be selected.

A further refinement of this method is as follows: In some situations, it may not be possible to achieve the target fill percentage (e.g. 80–100 percent), because real-world data is too discontinuous. When this occurs, some the data sizes of some parcels will fall in the range between (0–80) percent of the optimal parcel size. Under these circumstances, it would be preferable if the parcel size were equal to the optimal percent size divided by 2K. If a buffer size in the memory of the navigation system is P, then it is possible to make more efficient use of buffer space if the parcel sizes are P, P/2, P/4, etc. (rather than ¾×P, ⅝×P, etc.). The reason for this is as follows: When a record size is P/2K, it is more likely that a buffer slot can be found for it without rearranging other records in the cache of the memory of the navigation system. Therefore, when the data size of the rectangle being divided is less than 2×P, the tables described above are augmented with additional ranges representing the optimal parcel size divided by 2K, for K in the range from 1 to about 3. In the above example, the two tables would be augmented with the following ranges:

| Minimum | Maximum |
| --- | --- |
| First Table: | |
| 0.1 × P | 0.125 × P |
| 0.2 × P | 0.25 × P |
| 0.4 × P | 0.5 × P |
| Second Table: | |
| 0.105 × P | 0.12 × P |
| 0.21 × P | 0.24 × P |
| 0.42 × P | 0.48 × P |

In the First Table, above, acceptable ranges are defined for 80% to 100% of ⅛ times the maximum parcel size (0.1P–0.125P), 80% to 100% of ¼ times the maximum parcel size (0.2P–0.25P), and 80% to 100% of ½ times the maximum parcel size (0.44P–0.5P). In the Second Table, above, acceptable ranges are defined that take into account the approximately 4% tolerance for errors in estimating. In the Second Table, above, acceptable ranges are defined for 84% to 96% of ⅛ times the maximum parcel size (0.105P–0.12P), 84% to 96% of ¼ times the maximum parcel size (0.21P–0.24P), and 84% to 96% of ½ times the maximum parcel size (0.42P–0.48P).

The parcelization method described herein facilitates use of the geographic data for many types of navigation functions. In addition to the above described ways to parcelize the geographic data, there are other ways in which the data can be parcelized. Further, given a parcelization method, such as any of those described above or other types as well, further improvements can be obtained by ordering of the parcels.

III. Assignment of Entity ID's

Each of the different types of data (routing, cartographic, maneuver, and so on) and each layer of some of these types of data, are separately parcelized. As the parcels for each different type of data and for each different layer of data are being formed, data entity ID's are assigned. In this embodiment, data entities that are assigned data entity ID's include segment entities and node entities. Each data entity ID uniquely identifies the entity record in the geographic database and can be used to refer to a particular data record.

The method used to assign data entity ID's facilitates use of the data. Data entities are assigned ID's based upon the parcels in which they are located. Segment data entities are assigned ID's separately from node data entities, however, segment data entities and node data entities are assigned entity ID's together on a parcel by parcel basis.

Starting with the first parcel, entity ID's are assigned to each segment data entity in the parcel. The entity ID's may be assigned to the segment records within a parcel in sequence order, e.g. 00000001, 00000002, 000000003, and so on, or alternatively, may be assigned in a manner such that some numbers are skipped. After all the segment records in the first parcel are assigned entity ID's, the segment records in the second parcel are assigned entity ID's. In a preferred embodiment, none of the segment ID numbers assigned to segment records contained in one parcel overlap with the segment ID's assigned to segment records in another parcel, and furthermore the entity ID's have the following binary search property: for any division line made when forming the (routing layer 0) parcels containing segments, all segment entity ID's on one side (e.g. the south or west side) are less than all segment entity ID's on the other side. For example, if 58 segment records are contained in the first parcel (such as the parcel 57(1) in FIG. 9 formed from the rectangle 50(1) in FIG. 8), and 91 segment records are contained in the second parcel (e.g. parcel 57(2) in FIG. 9), the segment entities in parcel 57(1) may be assigned segment ID's 0000000 through 0000057, and the segment entities contained in parcel 57(2) may assigned segment entity ID's 000100 through 000190.

Within each parcel, ID's are assigned to each entity so that at least one further possible dividing line can be made to the rectangle from which the parcel is formed so that all the entity ID's on one side of the possible further dividing line are less than all the entity ID's on the other side of the dividing line. In a preferred embodiment this assignment of entity ID's to entities within a parcel is according to Peano-key order starting at one corner, such as the southwest corner. If Peano-key ordering is used, node entities are assigned node entity ID's in order by location and segment entities are assigned segment entity ID's in order based upon the location of the segment's left-most node location (or south-most if the right and left nodes have the same longitude). In an alternative embodiments, the entity ID's can be assigned in an order other than Peano key order, such as by the latitudes of the entities, or the longitudes of the entities (leftmost node of segment entities, for example). Other ordering may be used provided that the entity ID's are assigned so that there is at least one division of the entities in rectangle so that all the entity ID's south or west of the division have ID's less then all the entities on the north or east side of the division.

The parcel represents the minimum amount of data that can accessed at one time. All of the data in a parcel are loaded into the RAM of the navigation system together with the same single disk access. Therefore, accessing any one record within a parcel can be done relatively quickly.

In this embodiment, the entities are assigned entity ID's based on the order in which the parcels are formed. In a present embodiment, all the entity ID's in a first parcel are assigned ID's before any entities in the second parcel are assigned entity ID's. All the entity ID's assigned to data entities in any parcel are numerically lower than all the entity ID's in any later ordered parcel. Assignment of node entity ID's is made in a similar manner.

IV. Subsequent Parcelizations

Each of the different types of data (routing, cartographic, maneuver, and so on) and each layer of some of these types of data, are separately parcelized. However, in a present embodiment, these types of data, and the layers of data of the same types, are parcelized in parallel. This means that after one type of data is parcelized, parcelization of another type of data is performed using the same rectangle boundaries (i.e. dividing lines) that were used for the first type. It is preferred to start parcelizing the type of data expected to be most dense. A subsequent parcelization of a less dense type of data will follow the same rectangle boundaries that were used for the first type of data. However, since the second type of data may be less dense, it may be possible to form a parcel of the second type of data without making as many divisions of rectangles encompassing the features represented by the data. This would have the result that a parcel of one type of data may represent geographic features encompassed by a larger sized rectangle than a parcel of another type of data. However, whenever a division of data is to be made, it is made along the same rectangular boundary division as was made in the prior type of data.

For example, referring to FIG. 10E, assume that the first type of data being parcelized is routing data and a subsequent type of data being parcelized is cartographic data. Assuming that the cartographic data were less dense than the routing data, it may not be necessary to divide the region 12 into a rectangle as small as the rectangle 55(1)(1)(1)(1) in order to form a parcel of the cartographic data. Instead, it may be possible that the rectangle 55(1)(1)(1) (see FIG. 10C) formed by the line 56(3) is sufficiently small so that the cartographic data encompassed by the rectangle 55(1)(1)(1) are not greater than the maximum size for a parcel. In such a situation, a cartographic data parcel is formed of the cartographic data encompassed by the rectangle 55(1)(1)(1).

When parcelizing one type of data after a first type of data has already been parcelized, it may sometimes occur that the subsequent type of data is more dense in a portion of the region than the type of data which has already been parcelized. In this situation, the smallest rectangle formed by the prior parcelization of data may not be small enough for forming a parcel of data of the subsequent type of data. In such a situation, the subsequent type of data is further parcelized using the procedure described below.

Parcelization Procedure for Data Types More Dense than Routing Layer 0:

As mentioned above, node and segment entity ID's are assigned within parcels in an order so that there is at least one additional dividing line of the rectangle from which the parcel is formed so that all the entity IDs' west or south of the dividing line are less than all the entity ID's east or north of the dividing line. In a preferred embodiment, Peano key ordering provides at least one such additional dividing line. In parcelizations subsequent to an initial parcelization, whenever a rectangle representing an existing parcel (of a previously created parcel type) must be divided into two or more rectangles in order to create parcels of a new type, the dividing line is chosen so that the Peano keys of all the points in the northern or eastern sub-rectangle are larger than the Peano keys of all the points in the western or southern sub-rectangle.

Figure 12A:
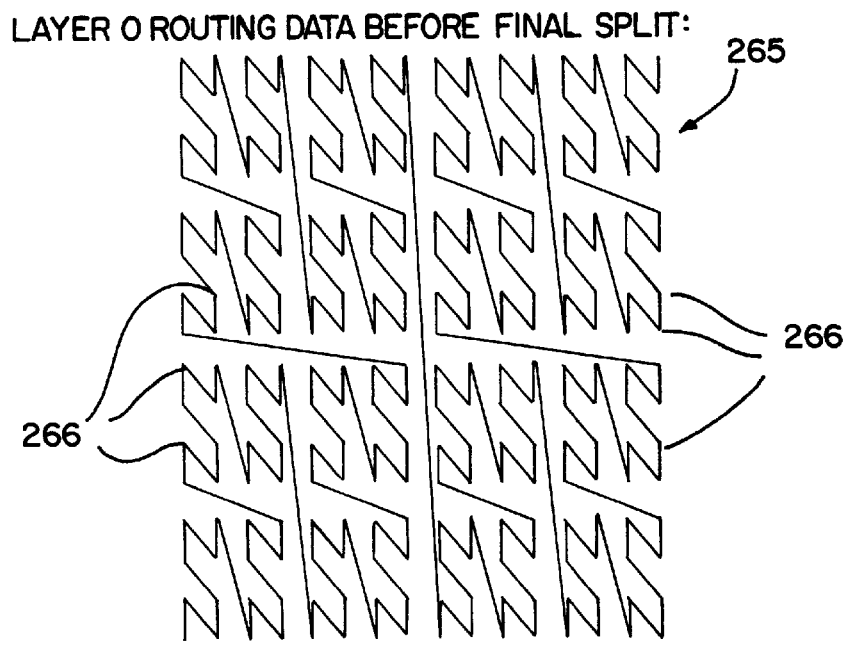
FIGS. 12A–12H are maps illustrating a process for parcelizing a type of data more dense than a previously parcelized type of data.
Figure 12B:
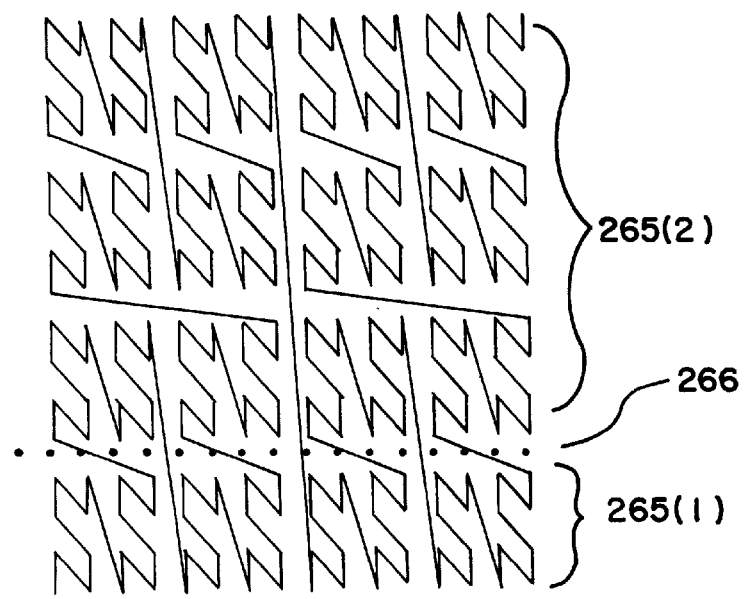

This procedure is illustrated in FIGS. 12A–12H. FIGS. 12A–12H are a set of diagrams illustrating a rectangular geographic area 265. This rectangular area 265 includes a plurality of points 266. In these diagrams, the points (equivalents to "nodes" in the geographic database) are shown linked together in Peano key order for the purpose of aiding visualization. (In an alternative embodiment, the points may be taken as representing the areas of rectangles of a grid of appropriate granularity such that each rectangle of the grid encompasses only one node in the geographic area.) The rectangular area 265 in FIG. 12A represents an area of routing layer 0 data before the final division which forms two routing layer zero parcels. FIG. 12B shows the rectangular area 265 divided into two rectangular areas 265(1) and 265(2) by a dividing line 266. Two routing layer 0 parcels are formed from the data encompassed in the two rectangles 265(1) and 265(2). As noted above, the points (nodes) are assigned entity ID's in Peano key order.

Figure 12C:
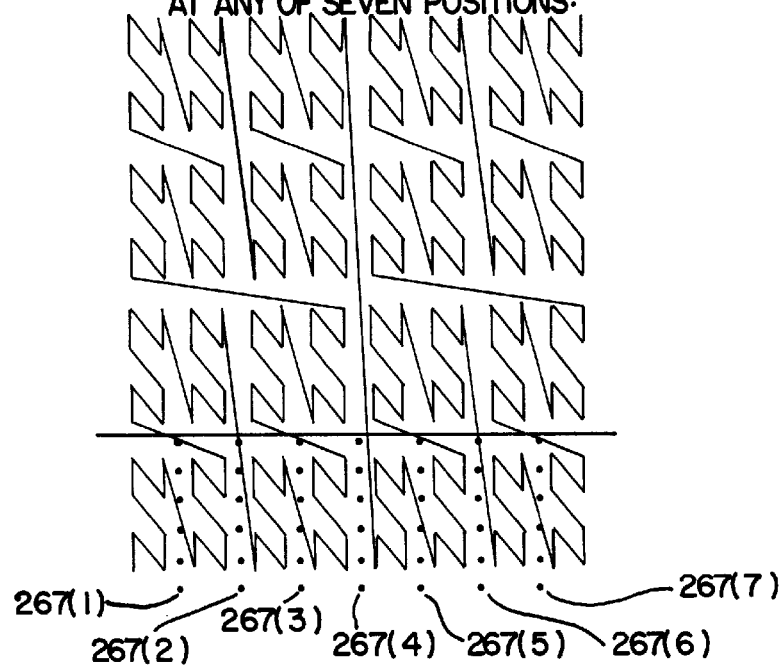
Figure 12D:
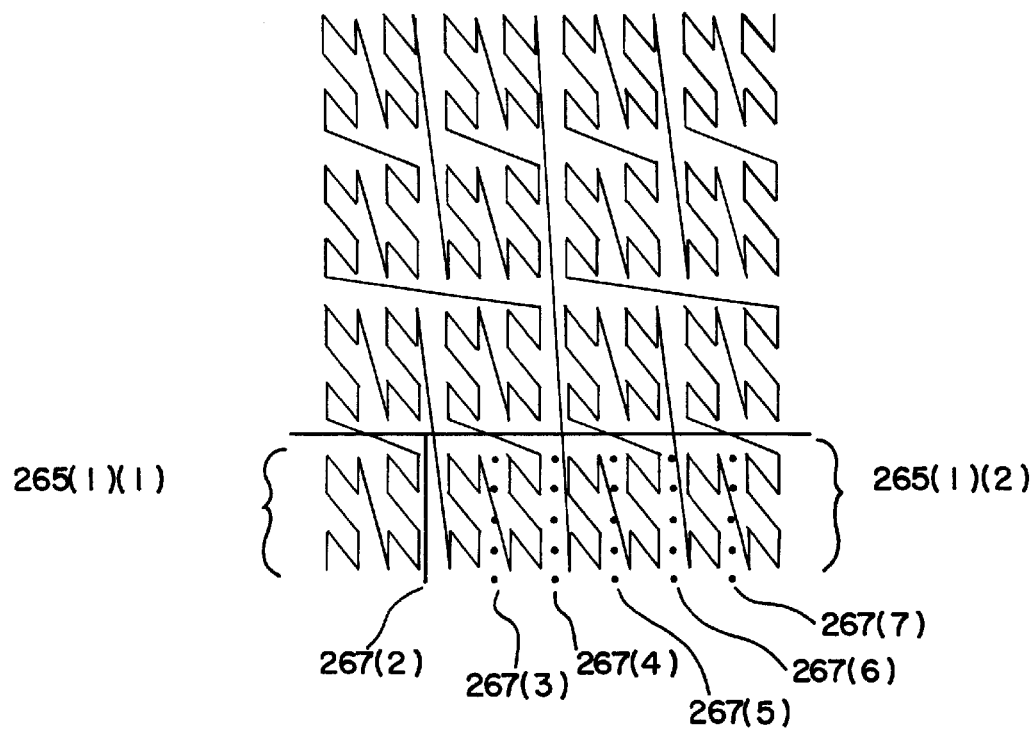

Assume that in a subsequent parcelization of a different type of data, the data encompassed in the rectangular area 265(1) is greater than the maximum parcel size and therefore the rectangular area 265(1) must be divided again. When the rectangle 265(1) is divided, the dividing line is chosen so that the Peano keys of all the points in the northern or eastern sub-rectangle are larger than the Peano keys of all the points in the western or southern sub-rectangle. It may happen (depending on the boundaries of the original rectangle) that there is only one dividing line available that meets this criterion, but sometimes there are several. In FIG. 12C, it is shown that there are seven possible positions at which another division of the rectangle 265(1) may be made. These possible divisions are labeled 267(1)–267(7). Referring to FIG. 12D, the rectangular area 265(1) is shown divided with the line at 267(2) into two sub-rectangles 265(1)(1) and 265(1)(2). If the rectangular area 265(1)(2) must be divided again, there are still five possible dividing lines, labeled 267(3)–267(7), that can be used to divide the data encompassed in rectangle 265(1)(2) and still meet the criterion that the Peano keys of all the points in the northern or eastern sub-rectangle are larger than the Peano keys of all the points in the western or southern sub-rectangle. The line 267(6) is chosen, and rectangular areas 265(1)(2)(1) and 265(1)(2)(2) are formed, as shown in FIG. 12E.

Figure 12E:
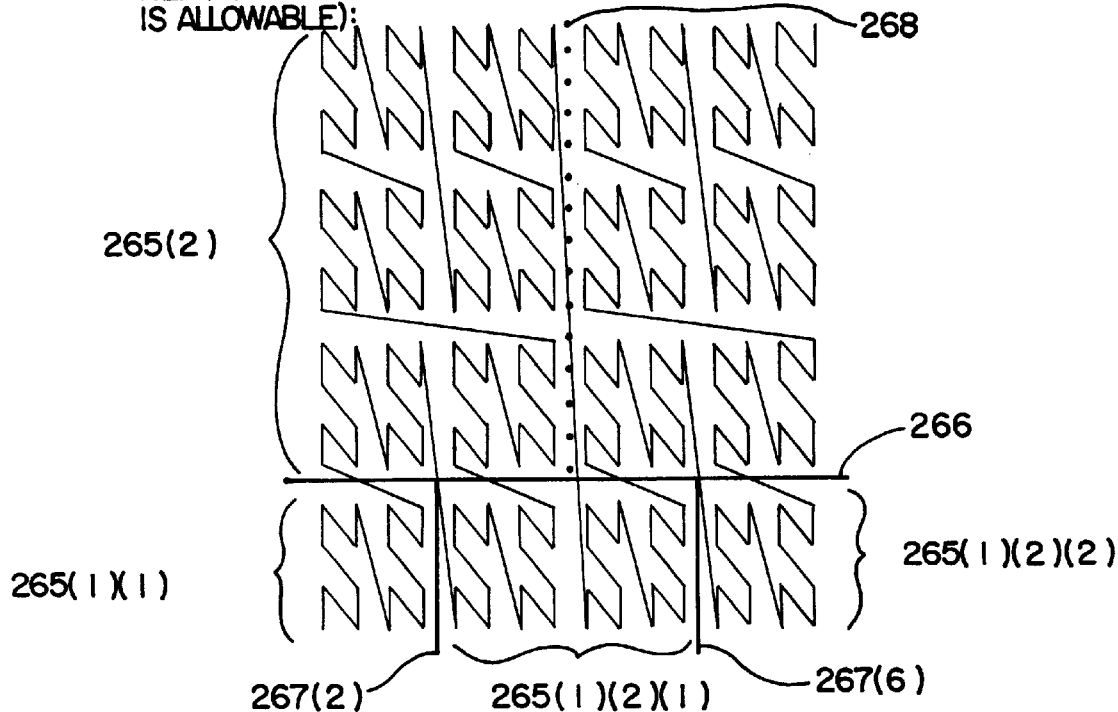
Figure 12F:
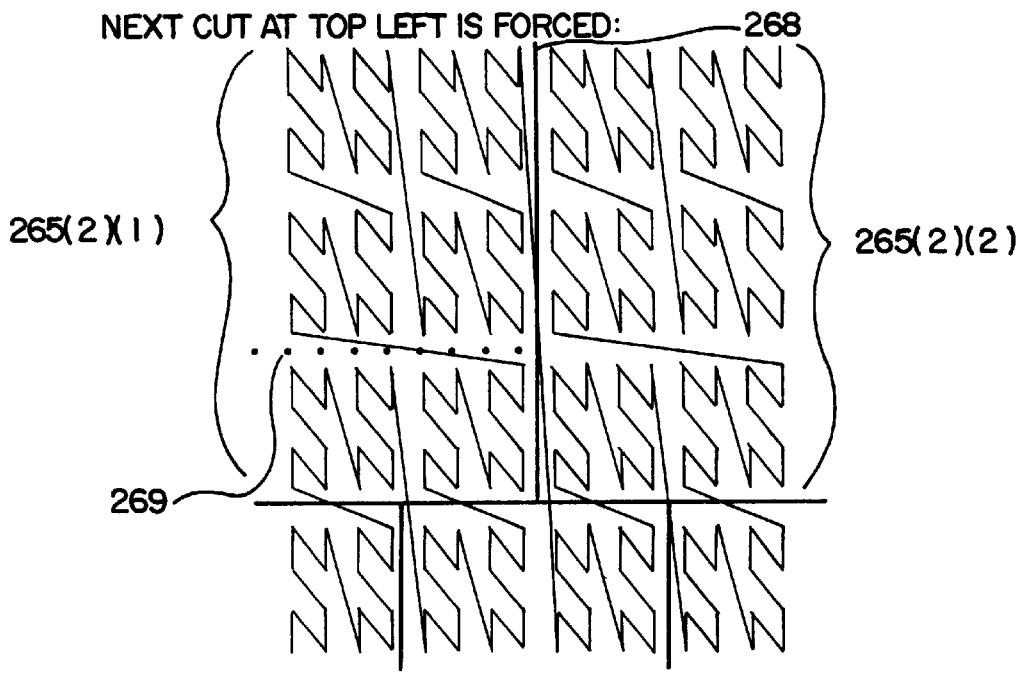
Figure 12G:
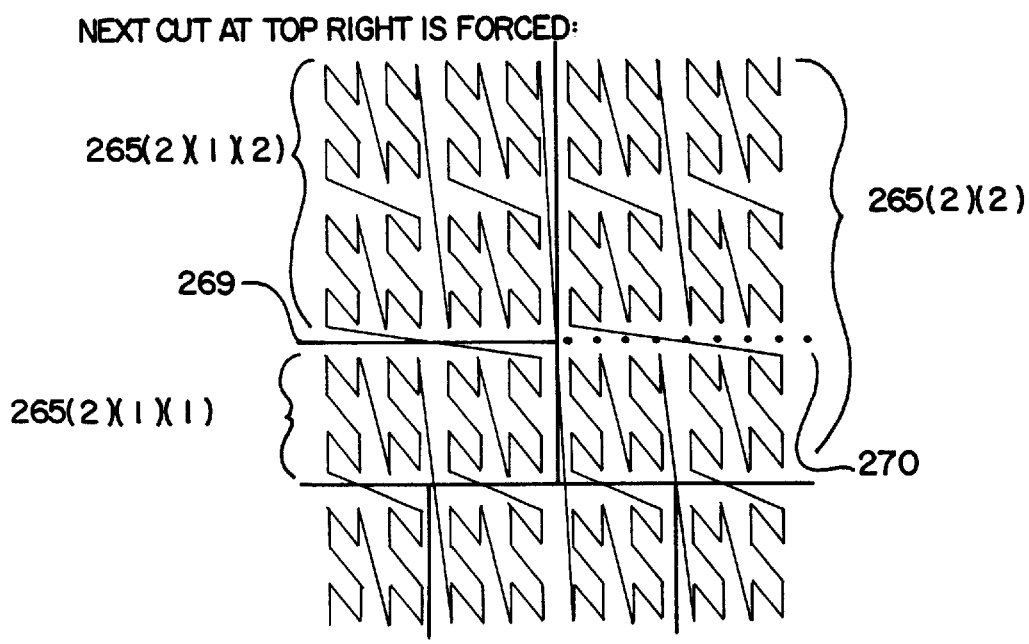
Figure 12H:
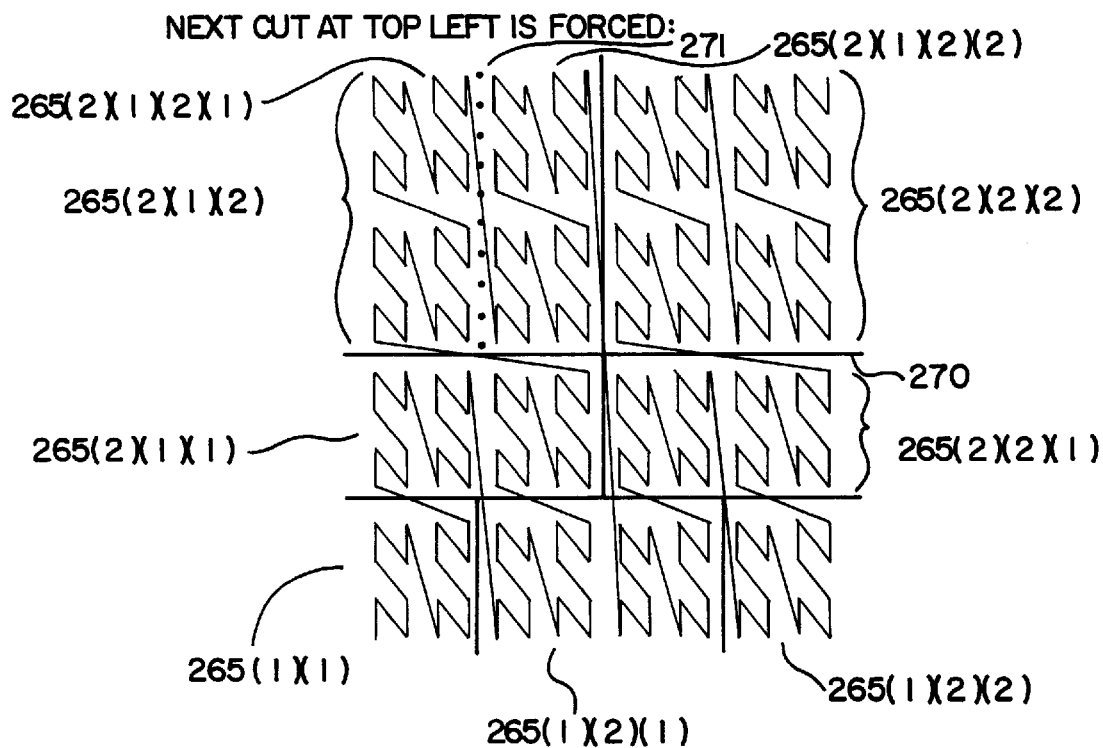

Referring to FIG. 12E, if the rectangular area 265(2) must be divided into smaller additional rectangles, there is only one location at which a division can be made, i.e. at the line 268. The rectangular area 265(2) is divided into rectangular areas 265(2)(1) and 265(2)(2), as shown in FIG. 12F. If the rectangular area 265(2)(1) must be further divided, there is only one possible dividing line 269, which meets the criteria. Using line 269, the rectangular area 265(2)(1) is divided into rectangular areas 265(2)(1)(1) and 265(2)(1)(2), as shown in FIG. 12G. Referring to FIG. 12G, if rectangular area 265(2)(2) must be divided, there is only one available dividing line 270. Using line 270, the rectangular area 265(2)(2) is divided into rectangular area 265(2)(2)(1) and rectangular area 265(2)(2)(2), as shown in FIG. 12H. If the rectangular area 265(2)(1)(2) must be further divided, there is only one dividing line 271 which meets the above criteria.

The above procedures are used to determine appropriate dividing lines for the formation of further sub-rectangular areas from which parcels can be formed when a type of data is more dense than a prior data type which has already been parcelized. When these new dividing lines are used, the parcels of the data type being formed from the sub-rectangular areas are ordered in accordance with their data entity ID's. For example, referring to FIG. 12H, the cartographic data parcels are ordered as follows: 265(1)(1), 265(1)(2)(1), 265(1)(2)(2), 265(2)(1)(1), 265(2)(1)(2),(1), 265(2)(1)(2),(2), 265(2)(2)(1), and 26(2)(2).

(As mentioned above, in an alternative embodiment, the entities within a parcel can be arranged in an order other than Peano key order provided that the binary search tree property is maintained, i.e. the entity ID's are assigned so that there is at least one possible dividing line of the rectangle from which the routing layer 0 parcel was formed so that all the entity ID's on one side of the dividing line are less than all the entity ID's on the other side of the line. One alternative way in which this can be accomplished is by ordering all the entities within a parcel by latitude only (or longitude only). This ordering would allow a division of a rectangle from which a parcel was formed at locations in the one direction along the rectangle in which the entity ID's are ordered. This alternative has the disadvantage that if a further division of either of the resultant rectangles is necessary, it would likely also have to be made with a division line in the same direction as the division line which formed the rectangle thereby possibly resulting in rectangles of high aspect ratio.)

As mentioned above, some of the types of data may be layered. Each layer is treated as a separate type of data for purposes of parcelization. Accordingly, for higher layers of data, i.e. layers having fewer data entities in them, parcelization is performed on the data starting with a collection of all the data for the entire region that meet the criteria for inclusion in that layer. When parcelizing higher layers of a type of data, the same rectangle boundaries determined for the parcelization of layer 0 are used. Since higher layers of a type of data are less dense than layer 0 (which includes all the data entities of a type for all ranks), parcels may be formed by rectangles of a larger size.

V. Ordering of Parcels

As the parcels are formed for all the types of data and for all the layers of each type, the parcels are ordered. Various types of ordering may be used. In general, it is preferred that the parcels be ordered in a manner that minimizes searches for data. In some of the functions in a navigation application program, there is sometimes a requirement to access data that represents features along routes or paths across parts of the geographic region. This may occur when calculating a route across the geographic region or when panning across the region. Sometimes these routes or paths extend over more than one of the rectangles from which the parcels of data were formed. Accordingly, starting with data in one parcel, there is a requirement for accessing the data in another parcel formed from a rectangle which is located adjacent to the rectangle from which the first parcel was formed. Since each rectangle may have several other rectangles adjacent to it, there is a need for ordering the parcels formed by the rectangles to minimize searches.

One way to order parcels is to use a depth-first ordering from the kd-tree index within each parcel type and layer. This provides an ordering similar to Peano-key ordering. Alternatively, Peano-key ordering may be used. Referring again to FIG. 6, each of these rectangles 42(1), 42(2), 42(3), 42(4), and so on, has been numbered. The parcels 43(1), 43(2), 43(3), 43(4), and so on, formed by the rectangles 42(1), 42(2), 42(3), 42(4), are ordered similarly in the geographic database 44 and/or on the medium 45, as shown in FIG. 7. This ordering of the parcels, as shown, provides the advantage that in general when going from one rectangle to an adjacent rectangle, the distance that the head moves when reading data from the storage media when going from the parcel corresponding to the one rectangle to the parcel corresponding to the adjacent rectangle is minimized. This has the result of in general minimizing the seek time for finding the data in parcels that correspond to adjacent rectangles in the geographic region. The parcels formed by the other parcelization procedures can be ordered similarly. Referring to FIG. 8, the rectangles 50(1), 50(2), 50(3), and so on, are ordered using a similar method. The parcels 57(1), 57(2), 57(3), formed from these rectangles are arranged accordingly, as illustrated in FIG. 9. Similarly, referring to FIG. 11, parcels formed from the rectangles 204(1), 204(1), 204(1), and so on, formed by the third and fourth parcelization procedures, can be ordered to minimize the distances between the parcels.

Essentially, the parcels are ordered in the order in which they are formed. This is in reverse order from which the divisions are made that are used to form the rectangles from which the parcels are made. (As noted above, in a preferred embodiment, for every division line made when forming rectangles, all data to west or south of the division line are formed into parcels before data to the east or north of division line.)

Each of the parcels so defined is assigned a "parcel ID." The parcel ID is a identification (e.g. a number) by which the parcel can be identified and it can be used to refer to the parcel when necessary to retrieve the parcel or any of the data contained therein. In a present embodiment, the parcel ID's are assigned to the parcels in the same order in which the parcels are formed and in the same ordered in which the parcels are ordered in the database. This has the advantage that, knowing the size of the parcels, the parcel ID can be chosen so as to be used as an offset from the beginning address of the database file to locate the position of the parcel on the media.

VI. Accessing Different Types of Data, Different Layers (KD-Trees)

As mentioned above, the geographic database includes separate subsets of data and separate layers of data. When operating a navigation system that uses these data, it is necessary to use these separate subsets and/or layers together in various different ways and combinations. For example, it may sometimes be required to use the results of one kind of function (that uses one type of data) as an input to another function (that uses a different type of data). An example of this is a map display function that may use as its input the data which had been output from a route calculation function. In this example, the map display function is required to find the cartographic data entities in the cartographic subset of data that correspond to the routing data entities that had been output from the route calculation function. Similar considerations apply when going from one layer of data to another layer of data. Accordingly, it is required to have a way of finding data in one subset or layer of data using the information from another subset or layer of data.

One way to accomplish this is to provide separate cross reference index files. Different kinds of indexes can be used and some indexes can operate relatively fast. However, many kinds of indexes are designed to specifically associate one kind of data to another, and hence are specialized for a particular purpose. Thus, in order to account for the different possible kinds of cross referencing that may be needed between the various different types of data subsets and layers, a number of different, specialized indexes would need to be provided. Each separate index requires some storage space on the media. Accordingly, to provide for all or many of the possible kinds of indexes would result in the use of a substantial amount of disk space.

Another way to find data in the geographic database is to use a kd-tree. A kd-tree is a kind of data structure that can be used to organize and search for data based on multiple attributes. A kd-tree can be used for spatial data because spatial data are characterized by multiple attributes (e.g. latitude, longitude, altitude). A kd-tree may be used to search spatial data by their location attributes.

Figure 13:
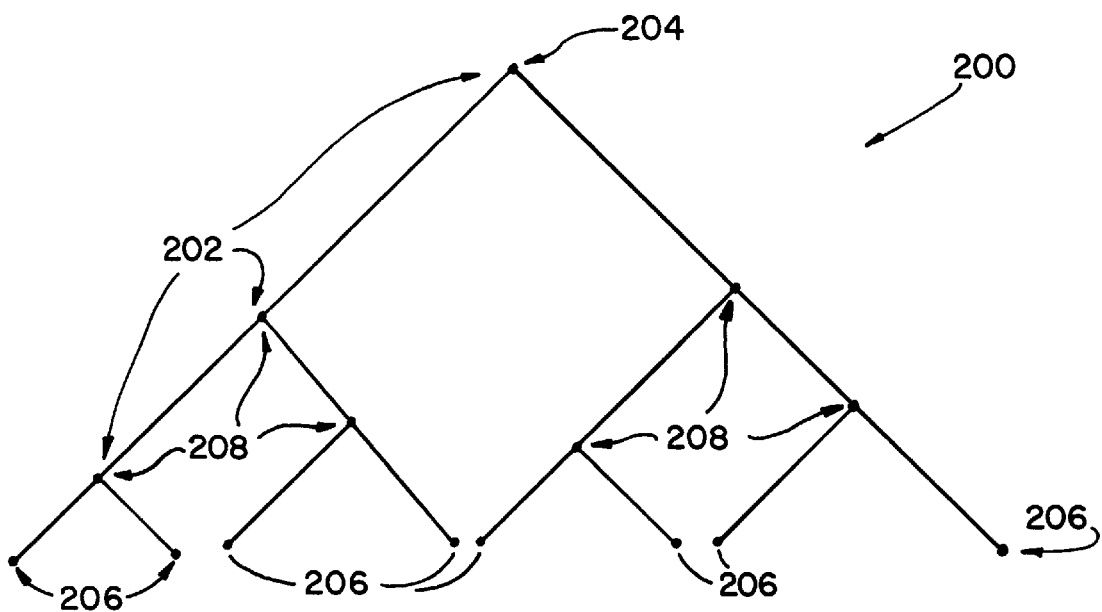
FIG. 13 is a diagram of a kd-tree.

A general form of a kd-tree is shown in FIG. 13. A kd-tree 200 has a plurality of nodes 202. Each node, except for the root node 204, has a parent node and a sibling node. All nodes, except for the leaf nodes 206, have two child nodes —a right descendant node and a left descendant node. All nodes that are not leaf nodes or the root node are internal nodes 208. A kd-tree can be used to organize and search for data by multiple attributes and in the case of spatial data, the multiple attributes can represent the position of a feature, i.e. the latitude and longitude of a feature. Data corresponding to locations in a region can be mapped to the nodes and the structure can be stored as a data file, in a manner described below in the section referring to parcelization of the kd-tree. Further, programs using the kd-tree data structure as an index to find the spatial data are known to those of skill in the art.

A kd-tree can be designed to find a particular point of data. However, with respect to geographical data that has been parcelized, as described above, the kd-tree structure is used as an index to find an entire parcel of spatial data formed by any of the parcelization procedures, mentioned above (or other parcelization procedures, as well). Because a parcel of data represents the smallest amount of data that can be accessed at one time in by the navigation system, an entire parcel will be accessed and read into the memory of the navigation system regardless of whether data corresponding to only one point or to many points in the parcel are required. Therefore, as used by the navigation application program, the kd-tree 200 is used to find a parcel of data based upon spatial information. When a navigation system is using any of the subsets of different types of data in the geographic database, the entire kd-tree for the entire database may be kept in memory to facilitate its use for finding parcels. Alternatively, only a part of the kd-tree may be kept in memory.

In a present embodiment, a global kd-tree is included that represents all the routing layer 0 parcels in the geographic database. This is because the routing layer 0 parcels are generated first in a present embodiment since they are likely to be most dense. In addition, each parcel may include a portion of the global kd-tree that includes only its neighboring parcels. In alternative embodiments, the kd-tree may be generated from another of the data types, such as the cartographic subset of data.

Figure 14:
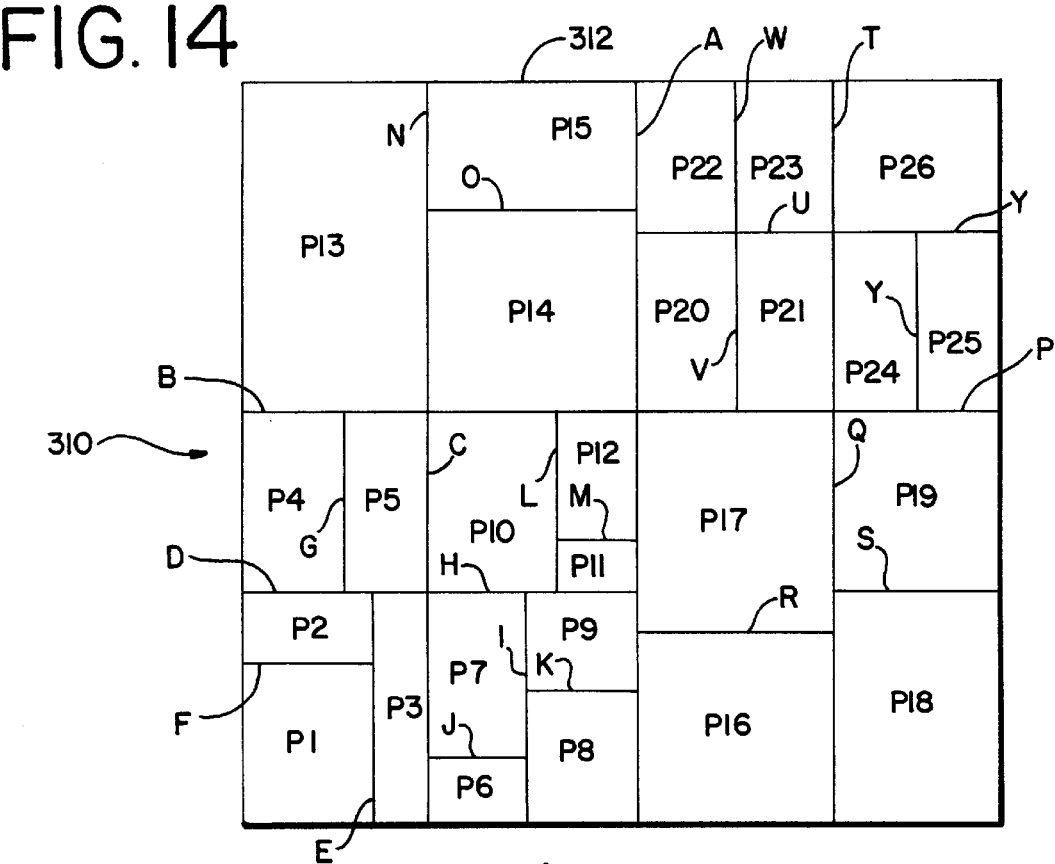
FIG. 14 is a map overlaid with divisions illustrating a parcelization method applied to a geographic area.
Figure 15:
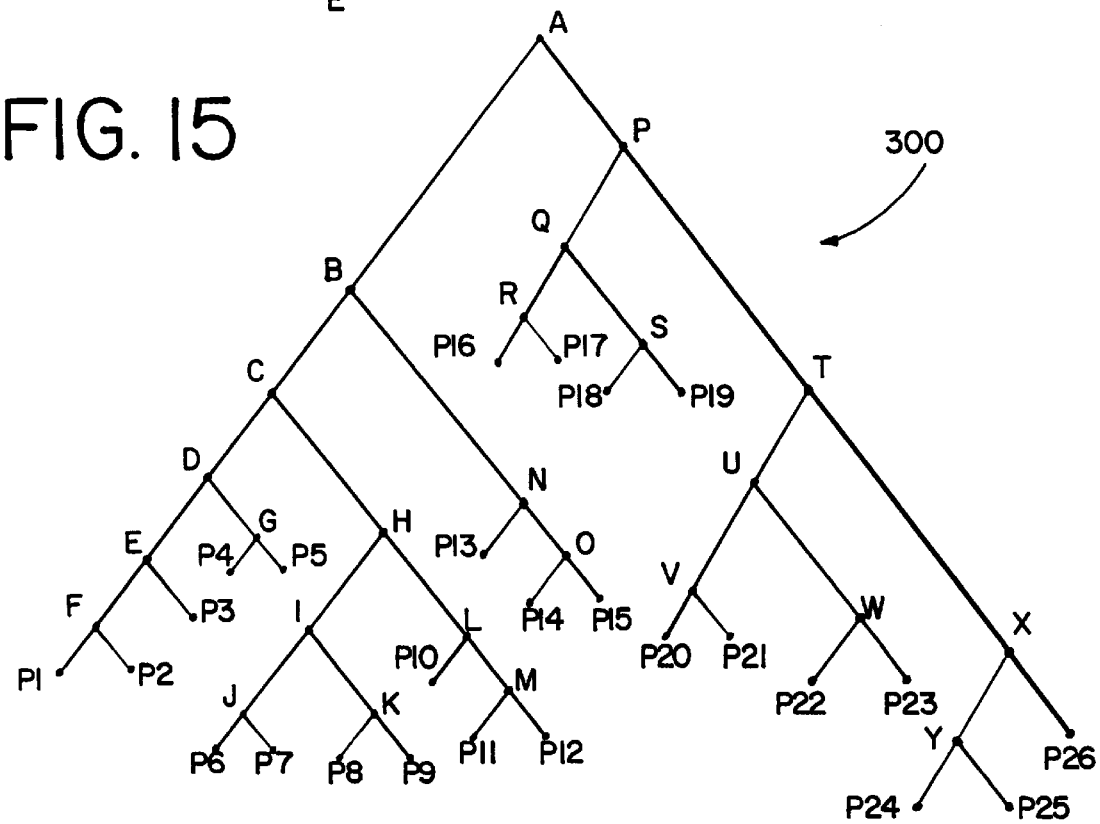
FIG. 15 is a kd-tree representing the parcelized data derived from the method shown in FIG. 14.

FIG. 14 shows a map 310 of a region 312 overlaid by a plurality of rectangles each of which encompasses data which forms a separate parcel. The parcelization method may be any one of the parcelization methods described above, in particular the third or fourth. FIG. 15 is a kd-tree representation 300 that corresponds to the parcelization of geographic data in the region 312 illustrated in FIG. 14. In the kd-tree 300 shown in FIG. 15, each kd-tree node (except for the leaf nodes) represents a location in the geographic region 312 at which a division is made. Accordingly, the nodes in the kd-tree 300 are labeled, e.g. A, B, C, and so on, corresponding to the divisions, A, B, C, and so on, on the map 310. The division may be a bisection, or may be along a line other than a bisection (such as described in connection with the third or fourth parcelization processes, above).

As mentioned above in connection with the various parcelization procedures, the different types of spatially-organized data (e.g. routing, cartographic, maneuver, and points-of-interest), are preferably parcelized in parallel. That is, where a division line at a location is used to define a parcel of one type of data, a division line at the same location is used (if necessary) to define parcels of another type (or layer) of data. Therefore, all the different kinds of spatially-organized data can be indexed via a single kd-tree. The kd-tree can be two dimensional because of the following: for any two spatial parcels, A and B, of the same or differing type or layer, it is always the case either that A is equal to B, A contains B, or B contains A.

In order to use the kd-tree as a spatial index, each node of the tree includes information about the geographic database. More specifically, in a preferred embodiment, information about the geographic database is stored as an entry at each node of the kd-tree. This information includes for example data identifying the left and right child offsets, if any, and a list of parcel descriptors (of data subset type and layer) and identifiers, if any, that permit the identification of parcels formed by the division represented by the node. The kd-tree contains implicit bounding rectangle information for each parcel because the parcelization procedures create parcel boundaries that can be encoded with a few bits (5 bits per division), as described below.

In a preferred embodiment, the entries corresponding to certain of the nodes in the kd-tree include segment entity ID information and node entity ID information. Each node of the kd-tree which defines a parcel includes information that permits identification of the range of segment and node entity ID's contained in the parcel. By including this segment and node ID information at these entries in the kd-tree, the kd-tree can be used as a binary tree search index for parcel ID's by segment or node entity ID, thereby facilitating searches for data. The reason that the kd-tree can be used in this manner results from the way in which the entity ID's are assigned. Each cut in the kd-tree which defines a parcel boundary also defines a cut in the interval of segment and node entity ID's such that all entity ID's to the south or west of each cutting line precede all entity ID's to the north and east of that cutting line.

Referring to FIG. 16, there is representation of the kd-tree entry 400 which includes the information stored at each node. Each division that divides a rectangle is described with a kd-tree entry of two or more bytes: two bytes of control information, zero or six bytes of segment and node entity ID's (described further below), 0–8 bytes to represent offsets to the left and right children (one or two or four bytes per offset), and zero or more bytes of parcel descriptors and identifiers. A one-byte or two-byte child offset represents an offset within the current parcel (from the current entry to the child entry, in 2-byte units). A four-byte offset represents a child in another kd-tree index parcel: this offset is made up of a two-byte offset from the initial kd-tree parcel to the kd-tree parcel containing the child, plus a two-byte tree identifier, identifying the tree within that parcel. Five bits of the control information are dedicated to the location of the dividing line that cuts the parent rectangle into left and right sub-rectangles (since this cut can be at any $\frac{1}{32}$ division of the rectangle's enclosing di-tile). Whenever either child of a kd-tree (internal of leaf) node corresponds to a parcel, a parcel descriptor (one byte) is present in the kd-tree, containing the parcel's type and layer, and other information. A parcel descriptor is followed, by a four-byte parcel ID. The order of fields in a kd-tree entry is as follows: (1) control data, (2) segment ID and node ID entity, if present, (3) left and right child offsets, if present (4) a list of parcel descriptors and ID's if present.

As mentioned above, whenever any of the left or right descendants of a kd-tree node are parcels, the entry will contain —explicitly or implicitly—a segment entity ID and a node entity ID. (In a present embodiment, each of these ID's is 24 bits.) Each segment/node entity ID represents the minimum segment or node entity ID present in the right sub-tree of the current kd-tree entry. This allows the kd-tree to be treated as a binary search tree for parcel ID's by node or segment entity ID. That is, because layer 0 routing data is parcelized first, entity identifiers for segments and nodes to the west/south of any rectangle division line are assigned before those to the east/north (and further parcelizations of data types more dense than layer 0 routing are formed to meet the entity ID division criteria described above), the kd-tree can be used to search the region spatially and can double as a binary search tree to search the region by segment or node entity ID. For any parcel type/layer, a binary search can be performed using this tree to locate the parcel of that type containing a given segment or node entity ID.

A bit flag is added to the control portion of the kd-tree node to indicate whether an entity ID field is present. The entity ID's should be present in any internal kd-tree node any of whose left or right descendants are routing layer 0 parcels or parcels formed from data more dense than routing layer 0 according to the procedure described above.

A pseudo-procedure for assigning entity ID's and forming a kd-tree in conjunction with parcelizing data is included in the APPENDIX of this specification.

The ability to use the kd-tree as a binary search tree is facilitated if the kd-tree is formed of the densest type and layer of data. This is usually the routing layer 0 subset of data. It may occur that a type of data other than routing data is more dense than routing data in portions of the geographic region. If this occurs, the other type of data may require being divided into additional smaller sub-rectangles in order to form parcels of data not exceeding the maximum parcel size. The procedure for forming such parcels is described above. Using this procedure allows these parcels to be included as additional nodes in the global kd-tree. In places in which a subsequent parcelization of a more dense type of data requires further divisions of rectangles beyond those used to form routing layer 0 parcels, the kd-tree is expanded to add additional nodes where the additional divisions are required to define the additional parcels. This allows the global kd-tree to be treated as a binary search tree below the level (in the tree) of routing layer 0 parcels, because the segment and node entity ID ranges assigned to these parcels' bounding rectangles have the characteristics that allow the global kd-tree to be treated as a binary search tree when searching for these parcels by segment or node entity ID. These characteristics include the following: (1) each such parcel's bounding rectangle represents one range of node entity IDs and one range of segment entity IDs each of which is disjoint from the node entity ID ranges and segment entity ID ranges of bounding rectangles of other parcels of the same type, and (2) these disjoint ranges are ordered such that the left descendants of any kd-tree represent an entity ID range less than the entity ID range of the kd-tree entry's right descendants.

In the preferred embodiment that uses a kd-tree that includes segment and node ID information in the nodes, a desired parcel can be located using only the segment or the node ID. With the preferred embodiment of the kd-tree, the routing segment ID can be used directly in the kd-tree to find the parcel in which it is located. Using the segment (or node) entity ID, one branches down the kd-tree to the kd-tree node in the kd-tree that corresponds to the division that formed the parcel containing the segment (or node) entity.

By adding the entity ID information to the kd-tree, certain kinds of required searches can be performed very quickly by means of the kd-tree. Some kinds of searches that previously required the need to retain position information can be performed more directly by using only the entity ID. Using a kd-tree formed in this manner provides advantages in the utilization of memory resources because it obviates the need to retain the position information for a group of segment data entities generated by a function. Moreover, the addition of the entity ID ranges to the nodes of the kd-tree may obviate the need to provide separate, specialized indexes for cross-referencing certain kinds of data. Further, the addition of the entity ID ranges to the nodes of the kd-tree may also allow looking up of parcel ID's from a node or segment entity ID so that node and segment data can be stored by entity ID alone, thus reducing memory requirements.

The improved searching features are provided by making a geographic database in a manner such it possesses the binary search property, as mentioned above. In one disclosed embodiment, this involves the steps of (1) separating data entities of a first type (such as routing layer 0 data) into a plurality of parcels so that each parcel includes a subset of such data entities and wherein the subset of data entities in each parcel represents features encompassed within a separate one of a plurality of rectangles each of which is formed by a set of rectangle boundary segments; and (2) assigning each of the data entities a data entity ID, such that there exists a first set of horizontal and vertical line segments containing each of the rectangle boundary segments, and further wherein all data entities which represent features due north of such a horizontal line segment have data entity ID's which are greater than those of any data entities which represent features due south of the horizontal line segment and all data entities which represent features due east of such a vertical line segment have data entity ID's which are greater that those of any data entities which represent features due west of said vertical line segment. (A feature is due north (south) of a horizontal line segment if the latitude of the feature is greater than (less than) the common latitude of the end points of the horizontal line segment and the longitude of the feature lies between the longitudes of the end points of the horizontal line segment. A feature is due west (east) of a vertical line segment if the longitude of the feature is greater than (less than) the common longitude of the end points of the vertical line segment and the latitude of the feature lies between the latitudes of the end points of the vertical line segment.)

The addition of the entity ID ranges to the nodes of the kd-tree that represent divisions that form parcels increases the size of the kd-tree. However, this increase in the overall size of the kd-tree is relatively small.

EXAMPLE

In this example, a use of the kd-tree for finding a parcel containing a particular entity is described. In this example, the use of a kd-tree that includes the entity ID information at its nodes that define parcels is compared to the use of a kd-tree that does not include entity ID information at its nodes. As demonstrated in this example, the inclusion of the entity ID information in the kd-tree facilitates certain types of searches by eliminating steps that would otherwise be required to find the desired information.

One type of function that is often required in a navigation application program is to get cartographic data to display maps upon which are highlighted a route calculated by the route calculation function. The route calculation function uses the routing data to provide an output consisting of a list of segment entity ID's. This list of segment entity ID's represents an "explored route" since the routing function operates by exploring various different possible routes to find an optimum route. Using this list of segment entity ID's from the routing function as an input, the map display function accesses the corresponding parcels containing cartographic data which contain the related cartographic segments entities that correspond to the routing segment entities.

If the segment ID's were not included in the certain nodes of the kd-tree, as explained above, the kd-tree would be used to perform a spatial search for a desired parcel ID, as follows:

Starting with the routing segment ID for each routing segment in the list, the routing parcel that contains the routing segment entity is loaded. This would be necessary to get the segment data entity record which would include the information about the location (latitude, longitude) of the segment entity. This position information for each segment entity in the list would be saved and then used in the kd-tree to perform a spatial search. In the kd-tree, the position information for each segment entity in the list would be used to branch down the kd-tree to find the cartographic parcel ID of the cartographic parcel that included the position of the routing segment. The step of branching involves examining the data at the kd-tree node that identifies the location of the dividing line represented by the node. This dividing line represented by the kd-tree node would be either a north-south dividing line or an east-west dividing line. The position information for each segment would be compared to the dividing line data represented by the kd-tree node and if it is larger, the right descendent of the kd-tree node would be examined, otherwise, the left descendent of the kd-tree node would be examined. This process would continue until a node identifying a cartographic parcel encompassing the position was found. Then, the cartographic parcel corresponding to the cartographic parcel ID would be loaded to obtain the cartographic records necessary to highlight the calculated route.

If the segment ID's are included in the appropriate nodes of the kd-tree, as explained above, the kd-tree can be used as a binary search tree to perform a binary search for a desired parcel ID, as follows:

Starting with the routing segment ID, the kd-tree nodes are examined for the segment ID ranges. If the kd-tree node has a segment ID greater than the routing segment ID being searched, examination proceeds down to the left descendent node, otherwise to the right descendent node. This process continues, as in a binary search tree, until a kd-tree node is found that represents the division that forms the routing parcel that contains the routing segment whose segment ID is being searched. Examination of the data at that node of the kd-tree identifies the corresponding cartographic parcel, i.e. the related parcel ID, which is then loaded to obtain the desired cartographic data records.

Using the kd-tree in this manner obviates the need to load the routing parcel that contains the routing segment entity whose entity ID is in the list, load the position information from the routing parcel, and search the kd-tree using the position information. Accordingly, the use of the kd-tree having entity ID ranges provides an efficient means to find related parcels.

Parcelization of the KD-Tree

In a preferred embodiment, the kd-tree is parcelized to facilitate storage of the tree on the data storage medium and to facilitate use of the tree for efficient searching in case the entire kd-tree cannot be retained in memory all at once. The global kd-tree is parcelized as follows. Nodes are stored in breadth first order to balance search times. If a parcel has been filled so that another node cannot be stored in it, then a new parcel is created and an unstored node is selected as a root for the new parcel and it is recursively stored in breadth first order. An index parcel may contain more than one root only if the complete sub-trees at these roots fit into the parcel, that is, if a complete sub-tree has been parcelized in an index parcel, then another highest level unstored node may be stored as another root in that index parcel only if its complete sub-tree fits into the parcel. This prevents unnecessary cross parcel index searching.

The roots are numbered (by tree identifier) in sequence starting with 0 within each index parcel. Thus, an inter-parcel reference to a node is by parcel ID (minus region specifier) plus tree ID. Intra-parcel reference to a node is by byte offset.

Alternatives

Alternative methods of parcelization, other than those described above, may be used. For example, the methods of parcelization described in U.S. Pat. No. 4,888,698 may be used.

In the above example, the segment entity ID was used to search for the related cartographic parcel. As mentioned above, in a preferred embodiment, the kd-tree also includes node entity ID ranges assigned to each parcel. Like the segment entity ID's, the node entity ID's are identified at the nodes in the kd-tree that represent the divisions that form the parcels that include the range. Therefore, in order to find a parcel, or related parcel that contains a particular node, one starts with node entity ID, uses the kd-tree as a binary search tree to branch down to the node of the kd-tree containing the parcel that includes the node entity ID range, and reads the related parcel ID's, as necessary. Using the node entity ID ranges in the kd-tree obviates the need to load the parcel that includes the node entity to obtain the position of the node, and then perform a spatial search of the kd-tree using the location information of the node.

The assignment of non-overlapping entity ID ranges with the binary search property to each parcel combined with the inclusion of information identifying the ranges of entity ID's included in a parcel at those kd-tree nodes that form parcels provides for the ability to use the kd-tree for binary searches (using the entity ID) as well as for spatial searches. The use of the kd-tree as a binary search tree is independent from the property of the kd-tree that permits it to be used for spatial searches.

In a further embodiment, a separate, standalone search tree may be provided to include just the entity ID's (segment and/or node). This standalone search tree could be a binary tree since it would provide for searching on only one key (the segment entity ID or the node entity ID). This binary search tree would be similar to the kd-tree generated for the parcels, except that it would not necessarily include the additional nodes in the kd-tree which do not contain entity ID information. This standalone binary search tree of entity ID's could be generated in parallel with the generation of the kd-tree.

It is intended that the foregoing detailed description be regarded as illustrative rather than limiting and that it is understood that the following claims including all equivalents are intended to define the scope of the invention.

APPENDIX

PROCEDURE TO PARCELIZE REGION X AND TO
CREATE A KD-TREE REPRESENTING THE PARCELIZED DATA:
1) Set NID to zero. Set SID to zero.
   These denote respectively, node IDs and segment IDs to be assigned.
2) Create kd-tree root entry TX.
   Initialize it to have no left child and no right child.
   Associate it with region X.
   Associate it with no parcel.
   Associate it with no node ID.
   Associate it with no segment ID.
3) Perform function PARCELIZE on Tree entry TX.
4) All "leaf" entries of the tree with root entry TX are now associated with node and segment IDs.
   To set node and segment IDs for "internal" tree entries, perform function SET_IDS on tree entry TX.
5) All "leaf" and "internal" entries of the tree with root entry TX are now associated with node and segment IDs. The kd-tee can now double as a binary search tree for node or segment IDs.
Function PARCELIZE (Tree entry T);
1) Let R be the region associated with entry T.
2) If R is small enough to be made into a parcel:
   a) Associate entry T with node ID "NID".
      Associate entry T with segment ID "SID".
   b) Create parcel P.
      For each node in R:
      i) Assign it Node ID "NID".
      ii) Add 1 to NID
      For each segment in R:
      i) Assign it Segment ID "SID".
      ii) Add 1 to SID.
   c) Associate parcel P with tree entry T.
3) Otherwise:
   a) Divide R into two regions R1 and R2 with a horizontal or vertical line, such that R1 denotes a region to the west or south of R2.
   b) Create kd-tree entry T1. Set the left child of T to T1.
      Associate region R1 with tree entry T1.
      Associate no parcel with tree entry T1.
      Associate no node ID with tree entry T1.
      Associate no segment ID with tree entry T1.
   c) Create kd-tree entry T2. Set the right child of T to T2.
      Associate region R2 with tree entry T2.
      Associate no parcel with tree entry T2.
      Associate no node ID with tree entry T2.
      Associate no segment ID with tree entry T2.
   d) Perform function PARCELIZE on tree entry T1.
   e) Perform function PARCELIZE on tree entry T2.
Function SET IDS (Tree entry T):
1) If tree entry T has no child tree entries, this function is complete.
2) Otherwise:
   a) Let LT be the left child tree entry of tree entry T.
      Let RT be the right child tree entry of tree entry T.
   b) Perform function SMALLEST_IDS on tree entry RT.
      Associate node ID "SMALLEST_NODEID" with tree entry T.
      Associate segment ID "SMALLESET_SEGID" with tree entry T.
   c) Perform function SET_IDS on tree entry LT.
   d) Perform function SET_IDS on tree entry RT.
Function SMALLEST_IDS (Tree entry T)
1) If the tree entry T has no child entries:
   a) Set "SMALLEST_NODEID" to the node ID associated with tree entry T.
   b) Set "SMALLEST_SEGID" to the segment ID associated with tree entry T.
2) Otherwise:
   a) Let LT be the left child tree entry of tree entry T.
   b) Perform function SMALLEST_IDS on tree entry LT.

We claim:

1. A method of making a geographic database for a geographic region comprising:

separating a plurality of data entities of a first type into a plurality of parcels wherein each parcel includes a subset of said plurality of data entities of said first type, and wherein the subset of said plurality of data entities of said first type in each parcel represents features in a geographic area encompassed within a separate rectangle of a plurality of rectangles which together encompass all the features in the entire geographic region represented by said plurality of data entities of said first type; and assigning each of the plurality of data entities of said first type a data entity ID, such that all the data entities of said first type in each parcel have entity ID's that are either greater than or less than all the data entity ID's in all the other parcels containing data entities of said first type, wherein all of the rectangles encompassing features represented by data entities which are assigned data entity ID's greater than the data entity ID's in any one rectangle are located on the same side of either an east-west boundary of said one rectangle or a north-south boundary of said one rectangle.

2. The method of claim 1 wherein said plurality of data entities of said first type in each parcel are assigned data entity ID's in Peano-key order.

3. The method of claim 1 wherein said plurality of data entities of said first type in each parcel are assigned data entity ID's by order in one dimension.

4. The method of claim 1 further comprising the step of: forming a kd-tree index of the parcels.

5. The method of claim 4 further comprising the step of: ordering said parcels in a depth first order from the kd-tree index of the parcels.

6. The method of claim 4 further comprising the step of: including an indication of a range of entity ID's in each node of said kd-tree which represents a corresponding parcel which contains said range of entity ID's.

7. The method of claim 1 further comprising the step of: after the step of assigning each of said date entities of said first type a data entity ID, separating a plurality of data entities of a second type into a plurality of additional parcels, wherein said data entities of said second type represent said features in said geographic region and wherein each of said plurality of data entities of said second type corresponds to a respective one of said plurality of data entities of said first type, and wherein each additional parcel includes a subset of said plurality of data entities of said second type, and wherein the subset of said plurality of data entities of said second type in each additional parcel represent features in a geographic area encompassed within a separate one of a plurality of rectangles which together encompass all the plurality of data entities of said second type in the entire geographic region, wherein the plurality of rectangles which encompass the subsets of data entities of said second type and the plurality of rectangles which encompass the subsets of data entities of said first type coincide with each other.

8. The method of claim 7 further comprising the step of: forming a kd-tree index of the parcels of said first type of data.

9. The method of claim 8 further comprising the step of: ordering said parcels in a depth first order from the kd-tree index of the parcels.

10. The method of claim 1 further comprising the step of: after the step of assigning each of said data entities of said first type a data entity ID, separating a plurality of data entities of a second type into a plurality of additional parcels, wherein said data entities of said second type represent said features in said geographic region and wherein each of said plurality of data entities of said second type corresponds to a respective one of said plurality of data entities of said first type, and wherein each additional parcel includes a subset of said plurality of data entities of said second type, and wherein the subset of said plurality of data entities of said second type in each additional parcel represent features in said geographic area encompassed within a separate one of a plurality of rectangles which together encompass all the plurality of data entities of said second type in the entire geographic region, and wherein any of the plurality of rectangular areas which encompasses a subset of data entities of said second type which is smaller in area than the rectangular area which encompasses corresponding data entities of the first type is formed at a division of the rectangular area encompassing the data entities of the first type so that the data entity ID's assigned to the data entities on one side of the division are all greater than the data entity ID's assigned to the data entities on the other side of the division.

11. The method of claim 10 further comprising the step of: forming a kd-tree index of the parcels of said first type of data.

12. The method of claim 11 further comprising the step of ordering said parcels in a depth first order from the kd-tree index of the parcels.

13. The method of claim 7 wherein said data entities of said first type are routing data entities used by a route calculation function in a navigation application program and said data entities of said second type are cartographic data entities used by a map display function in said navigation application program.

14. A geographic database stored on a storage medium, said geographic database for use with a navigation application program and representing a geographic region, said geographic database comprising:

a plurality of data entities each of which represents a physical feature in the geographic region, wherein said plurality of data entities are separated into a plurality of parcels each of which contains data entities that represent features in a geographic area encompassed within a separate one of a plurality of rectangles which together encompass all the plurality of data entities in the entire geographic region;

wherein each of said plurality of data entities has a data entity ID;

wherein each of said plurality of parcels contains a disjoint range of data entity ID's associated with data entities in their respective parcel; and wherein each of the rectangles encompassing features represented by data entities which are assigned data entity ID's greater than the data entity ID's in any one rectangle are located on the same side of either an east-west boundary of said one rectangle or a north-south boundary of said at least rectangle.

15. In combination:

the geographic database of claim 14; and a kd-tree search index whose root and internal nodes correspond to divisions of said geographic region which form said plurality of rectangles, and whose nodes which represent rectangles from which parcels are formed include data identifying the ranges of data entity ID's included in the parcels so formed.

16. A search tree for parcels of geographic data embodied on a computer readable medium, wherein said geographic data corresponds to a geographic region wherein each parcel includes data represented by a range of entity identifications, comprising:

kd-tree structure having a root node, internal nodes, and leaf nodes, wherein each node except for said leaf nodes thereof correspond to a division in said geographic region; and wherein each node of the kd-tree structure that represents a division in said geographic region resulting in formation of an area that encompasses features represented by data corresponding to a parcel also includes information identifying a range of data entity identifications included in the parcel.

17. The invention of claim 16 wherein the range of data entity identifications associated with each parcel does not overlap the range of data entity identifications associated with any other parcel.

18. A geographic database stored on a computer-readable medium comprising:

a plurality of data entities representing physical features in a geographic region, wherein each of said plurality of data entities represents a feature in said geographic region and each of said plurality of data entities has associated therewith attributes identifying a position of the feature represented thereby;

wherein said plurality of data entities are arranged into a plurality of parcels wherein each parcel includes a portion of said plurality of data entities and each parcel corresponds to an amount of data that can be read in a disk access of said medium;

and wherein each of said plurality of data entities has an associated entity identification, such that the data entities in each parcel define a range of data entity identifications associated with the parcel; and wherein the range of entity identifications in each of said parcels does not overlap with the range of entity identifications in any other of said parcels.

19. A search tree for a plurality of parcels of geographic data embodied on a computer readable medium, wherein said geographic data corresponds to a geographic region wherein each parcel of said plurality of parcels includes data represented by a range of entity identifications, the search tree comprising:

kd-tree having a root nodes, internal nodes and leaf nodes, wherein each kd-tree node except for said leaf nodes thereof correspond to a division in said geographic region; and a binary tree for said entity identifications, said binary tree having a plurality of binary tree nodes, wherein each binary tree node represents a separate range of entity identifications; and wherein said binary tree is embedded within said kd-tree such that each binary tree node corresponds in position to the kd-tree node that represents the division that forms the parcel containing the range of entity identifications included in said parcel.

20. A method of searching for geographic data in a geographic database using a computer program, wherein the computer program performs the steps comprising of:

using a data entity ID to search nodes of a kd-tree for data indicating ranges of data entity ID's associated with divisions represented by nodes of said kd-tree; and obtaining data identifying a location in said geographic database at which desired geographic data are located by reference to one of said kd-tree nodes representing a division from which a parcel containing the data represented by said data entity ID was formed.

21. A geographic database structure embodied on a computer-readable medium, wherein geographic data are organized in a kd-tree searchable structure, and wherein each node of said kd-tree structure includes an entity identification indicative of a division of entities identifications so that said kd-tree can be used as a binary search tree using said entity identification divisions.

22. A method of making a geographic database for a geographic region comprising:

separating a plurality of data entities into a plurality of parcels wherein each of said data entities represents a physical feature in the geographic region and each parcel includes a subset of said plurality of data entities, and wherein the data entities in each parcel represent features in a geographic area encompassed within a separate one of a plurality of rectangles which together encompass all the plurality of data entities in the entire geographic region, assigning each of the plurality of data entities a data entity ID, such that all the data entities in each parcel have data entity ID's that are either greater than or less than all the data entity ID's in all the other parcels, and wherein within each parcel, data entity ID's are assigned so that at least one straight line division of the rectangular area encompassing the data entities in said parcel can be made which divides said data entities into two further rectangular areas which encompass data entities having data entity ID's which do not overlap each other.

23. A method of making a geographic database for a geographic region comprising:

separating a plurality of data entities of a first type into a plurality of parcels wherein each parcel includes a subset of said plurality of data entities of said first type, and wherein the subset of said plurality of data entities of said first type in each parcel represent features in a geographic area encompassed within a separate one of a plurality of rectangles each of which is formed by a set of rectangle boundary segments, such that all the features in the entire geographic region represented by said plurality of data entities of said first type are encompassed by said plurality of rectangles; and assigning each of the plurality of data entities of said first type a data entity ID, such that there exists a first set of horizontal and vertical line segments such that each of said rectangle boundary segments is contained in one of a first set of horizontal and vertical line segments, and further wherein all data entities of said first type which represent features due north of a horizontal line segment of said first set have data entity ID's which are greater than those of any data entities of said first type which represent features due south of said horizontal line segment of said first set and all data entities of said first type which represent features due east of a vertical line segment of said first set have data entity ID's which are greater that those of any data entities of said first type which represent features due west of said vertical line segment of said first set, wherein a feature is due north of a horizontal line segment of the first set if the latitude of the feature is greater than the common latitude of the end points of the horizontal line segment of the first set and the longitude of the feature lies between the longitudes of the end points of the horizontal line segment of the first set, wherein a feature is due south of a horizontal line segment of the first set if the latitude of the feature is less than the common latitude of the end points of the horizontal lines segment of the first set and the longitude of the feature lies between the longitudes of the end points of the horizontal line segment of the first set, wherein a feature is due west of a vertical line segment of the first set if the longitude of the feature is greater than the common longitude of the end points of the vertical line segment of the first set and the latitude of the feature lies between the latitudes of the end points of the vertical line segment of the first set, and wherein a feature is due east of a vertical line segment of the first set if the longitude of the feature is less than the common longitude of the end points of the vertical line segment of the first set and the latitude of the feature lies between the longitudes of the end points of the vertical line segment of the first set.

* * * * *

UNITED STATES PATENT AND TRADEMARK OFFICE
CERTIFICATE OF CORRECTION

PATENT NO : 5,953,722
DATED : September 14, 1999
INVENTOR(S) : Lambert et al.

It is certified that error appears in the above-identified patent and that said Letters Patent is hereby corrected as shown below:

On the title pge, item [57]
In the Abstract, line 17, please delete "any another" and replace with --any other--;

Column 4, lines 63 and 64, please delete "segment (s)" and replace with --segment(s)--;

Column 12, line 27, please delete "55(1)(1(1)(1)" and replace with --55(1)(1)(1)(1)--;

Column 12, line 46, after "and a rectangle", please delete "55(1)(1)(2" and replace with --55(1)(1)(2)(2)--;

Column 14, line 3, please delete "arid" and replace with --grid--;

Column 17, line 46, please delete "II";

Column 18, line 5, please delete "(3.2xP. in the example)" and replace with --(3.2xP, in the example)--;

Column 18, lines 54 and 55, after "Attorney Docket No. 7117-61" please insert --, now U.S. Patent No. 5,947,419,--;

Column 21, line 8, please delete "entities, however" and replace with --entities; however--;

Column 21, line 14, please delete "000000003" and replace with --00000003--;

UNITED STATES PATENT AND TRADEMARK OFFICE
CERTIFICATE OF CORRECTION

PATENT NO : 5,953,722
DATED : September 14, 1999
INVENTOR(S) : Lambert et al.

It is certified that error appears in the above-identified patent and that said Letters Patent is hereby corrected as shown below:

Column 23, line 67, please delete "and 26(2)(2)" and replace with --265(2)(2)(2)--; and Column 25, line 25, please delete "ordered" and replace with --order--.

Signed and Sealed this

Thirty-first Day of October, 2000

Attest:

Q. TODD DICKINSON

*Attesting Officer*     *Director of Patents and Trademarks*